United States Patent [19]
Quattromani et al.

[11] Patent Number: 6,016,510
[45] Date of Patent: Jan. 18, 2000

[54] TORUS ROUTING ELEMENT ERROR HANDLING AND SELF-CLEARING WITH PROGRAMMABLE WATERMARKING

[75] Inventors: Marc Alan Quattromani, Beaverton; Mark S. Myers, Portland, both of Oreg.

[73] Assignee: Siemens Pyramid Information Systems, Inc., San Jose, Calif.

[21] Appl. No.: 09/103,559

[22] Filed: Jun. 24, 1998

[51] Int. Cl.⁷ .................................................. G06F 13/00
[52] U.S. Cl. .......................................................... 709/233
[58] Field of Search ........................ 364/DIG. 1, DIG. 2; 709/200, 201, 218, 232, 233, 234, 235, 300

[56] References Cited

U.S. PATENT DOCUMENTS

| | | | |
|---|---|---|---|
| 4,933,933 | 6/1990 | Dally et al. ............................. | 370/406 |
| 5,105,424 | 4/1992 | Flaig et al. ........................... | 395/200.73 |
| 5,771,356 | 6/1998 | Leger et al. ......................... | 395/200.63 |

*Primary Examiner*—Robert B. Harrell
*Attorney, Agent, or Firm*—Burns, Doane, Swecker & Mathis, L.L.P.

[57] ABSTRACT

In a massively parallel processing (MPP) system, data transmission between a first routing element to a buffer in a second routing element can be controlled more efficiently by generating a high and low watermark for the buffer, wherein the watermark values are based on a period of time required to transmit data between the routing elements. The amount of data stored in the buffer is then continuously compared to the high watermark value, and if the amount of data in the buffer is greater than or equal to the high watermark value, the first routing element becomes blocked from transmitting additional data to the buffer in the second routing element.

30 Claims, 15 Drawing Sheets

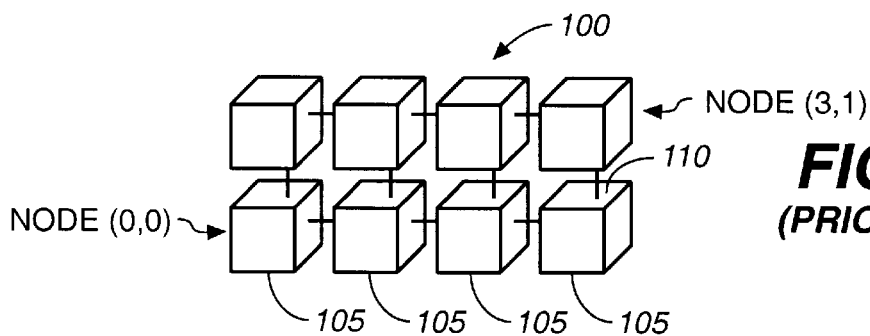
FIG._1
(PRIOR ART)
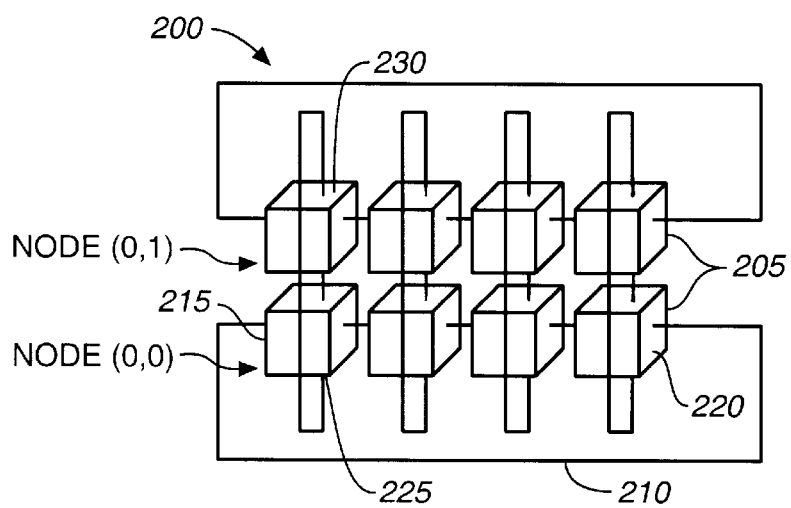
FIG._2
(PRIOR ART)
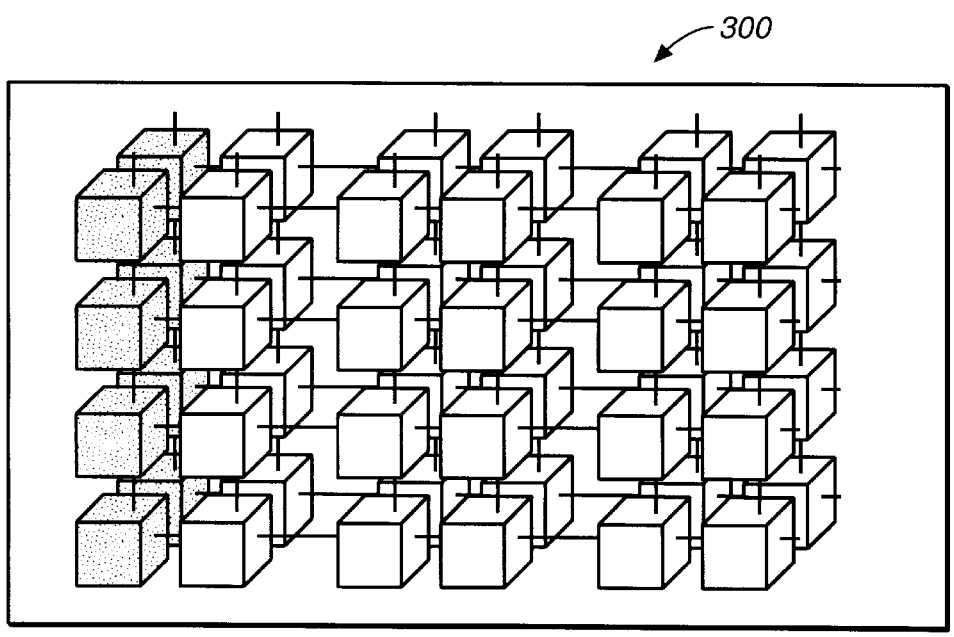
FIG._3
(PRIOR ART)

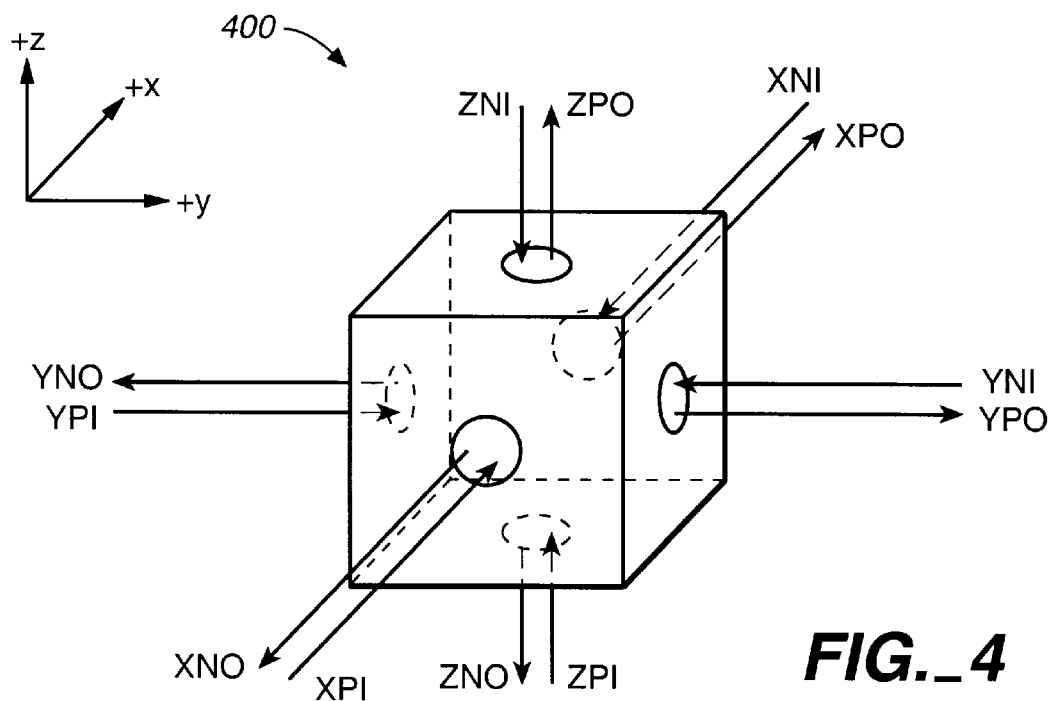
FIG._4
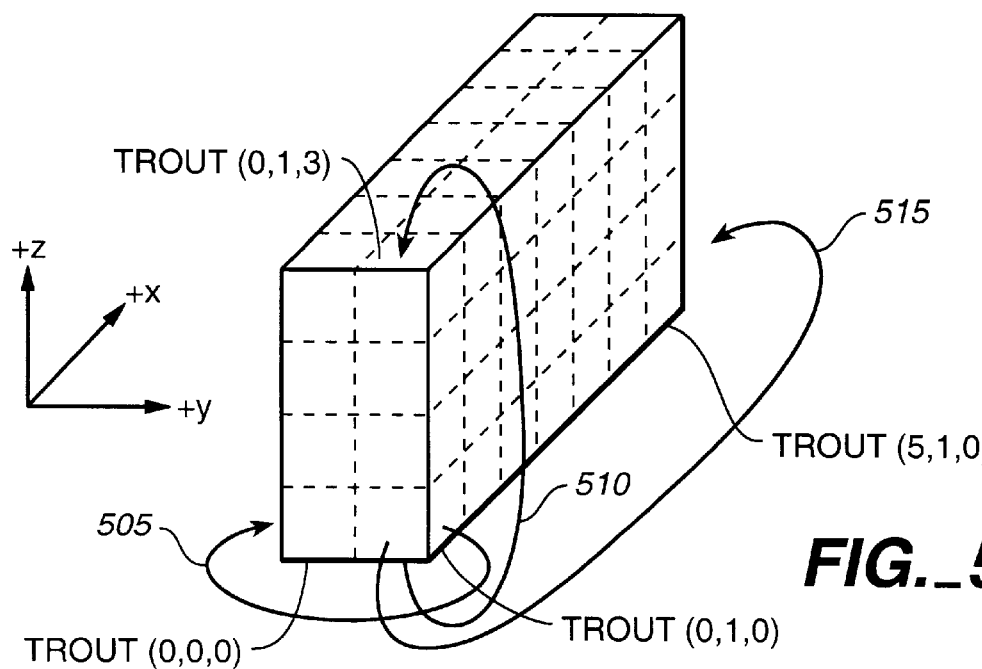
FIG._5

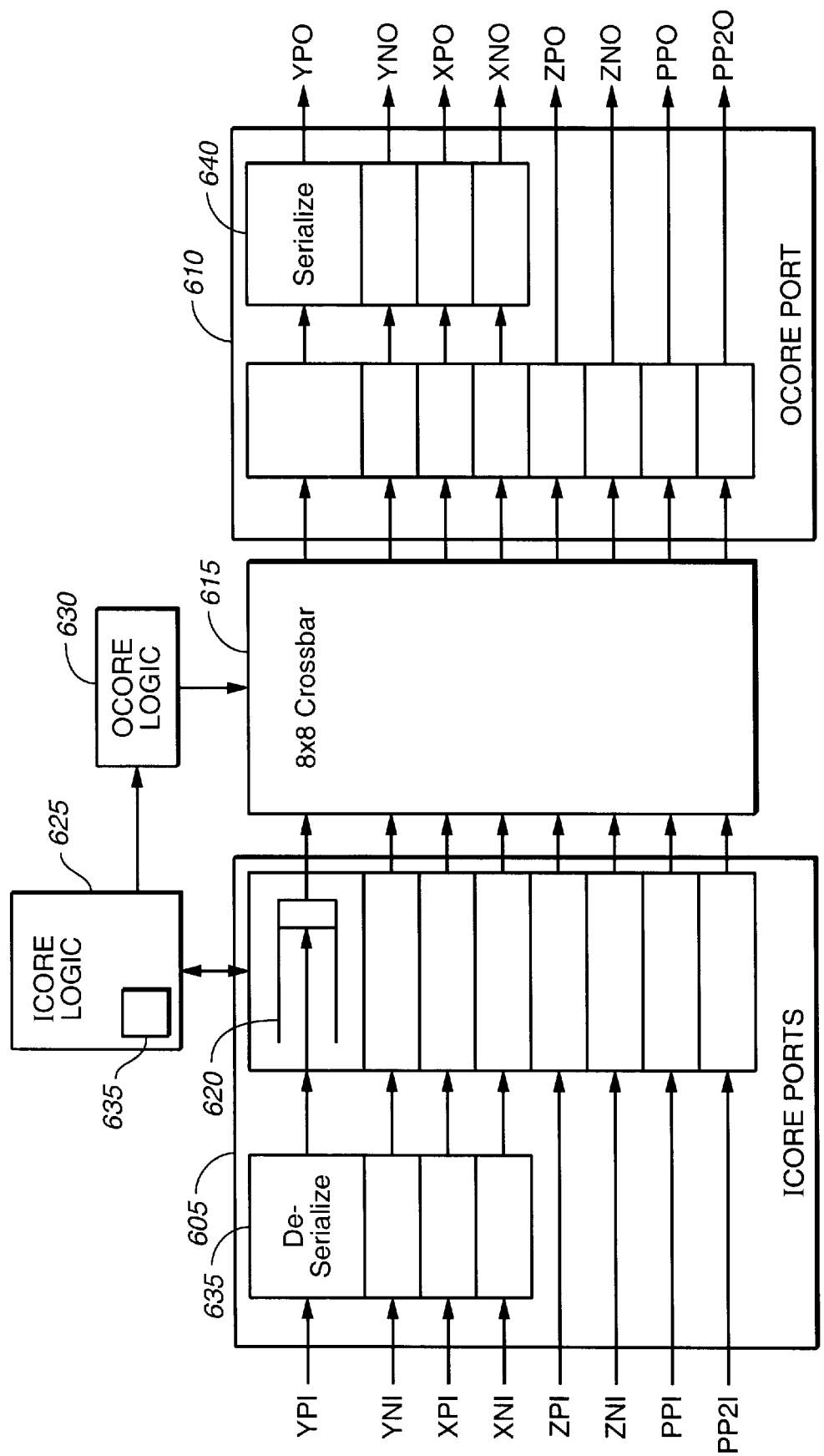
FIG._6

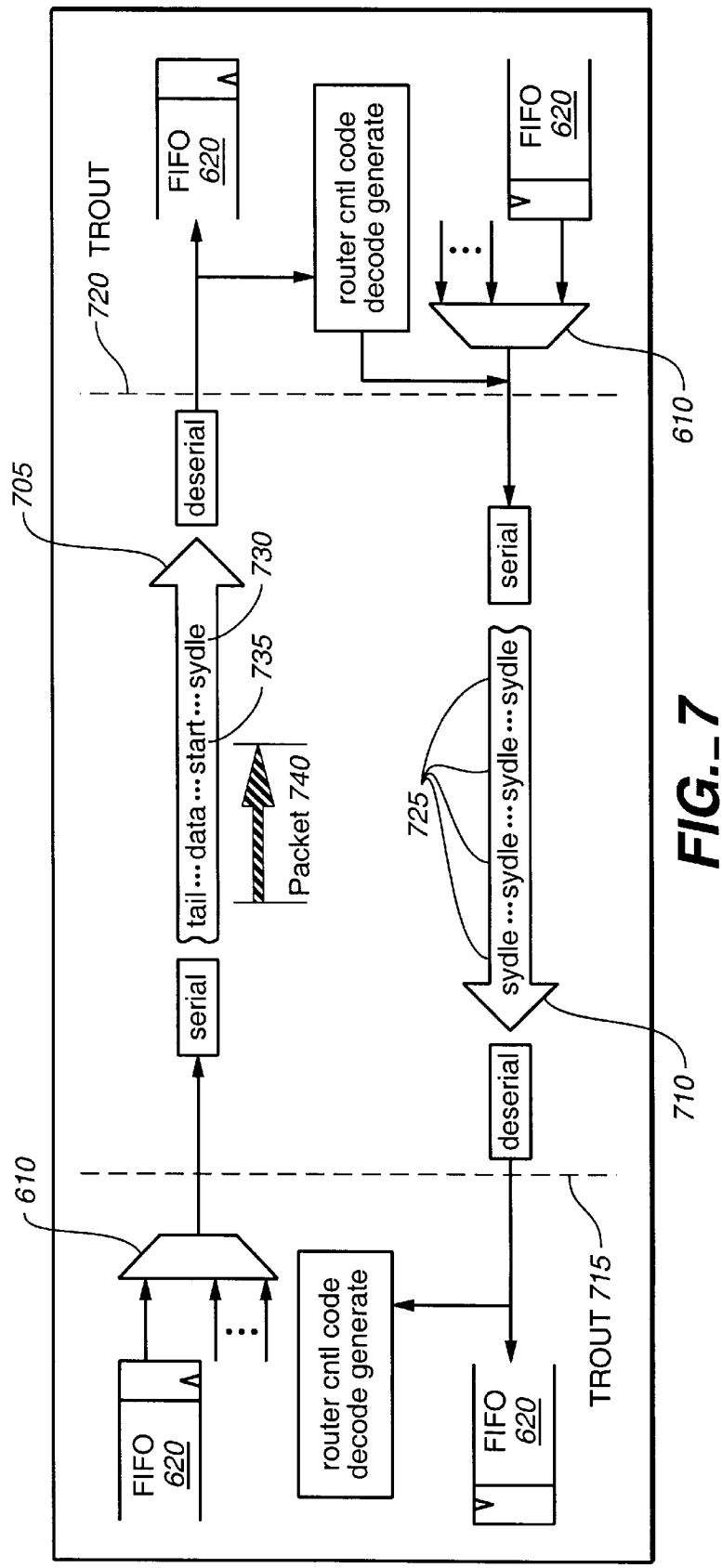
FIG._7

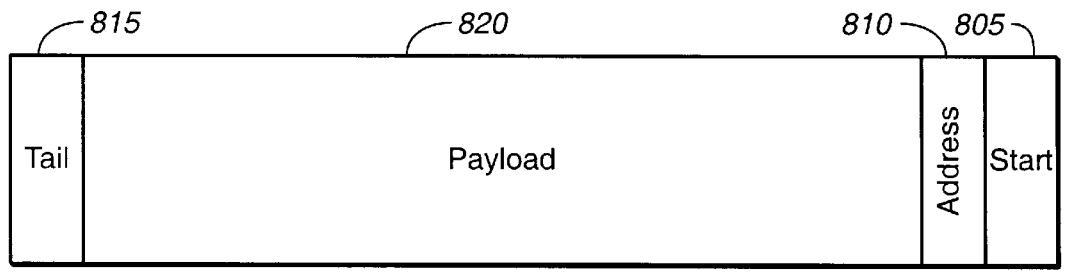
FIG._8 800
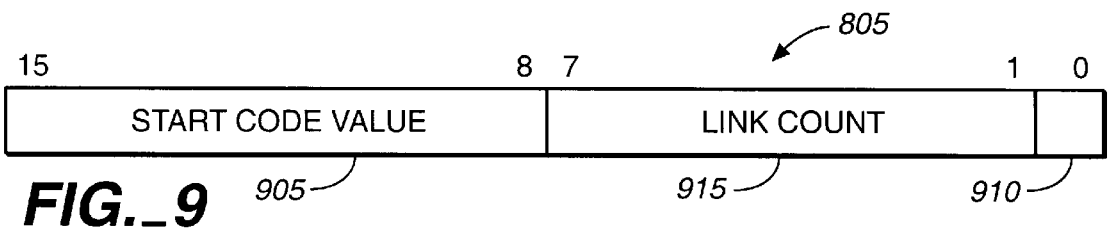
FIG._9 905
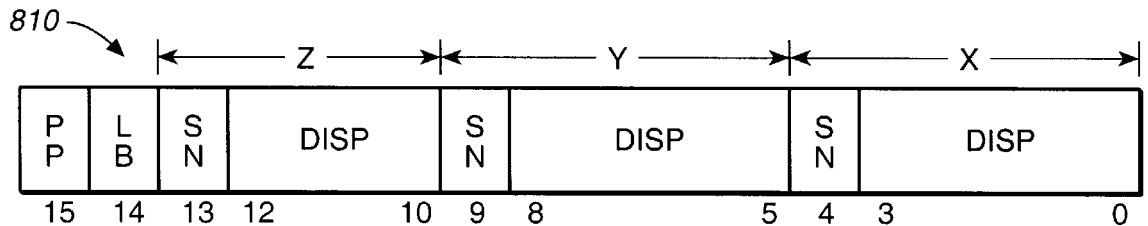
FIG._10
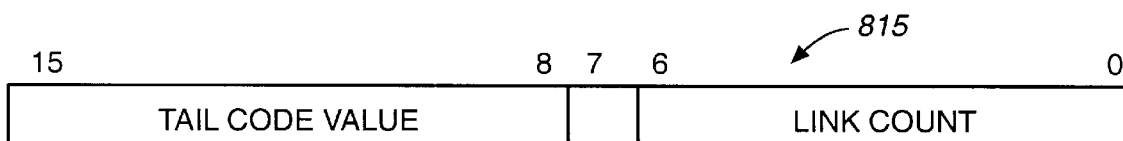
FIG._11
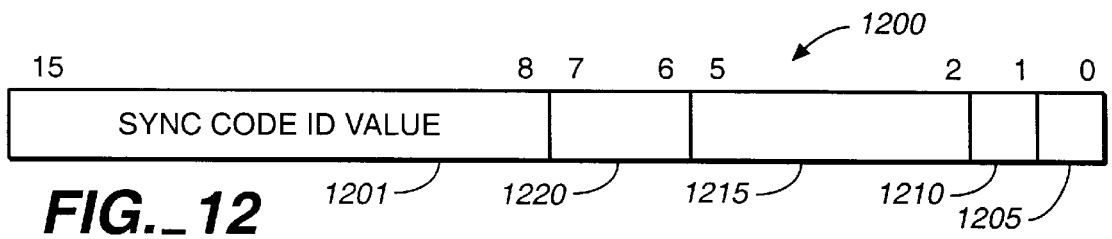
FIG._12

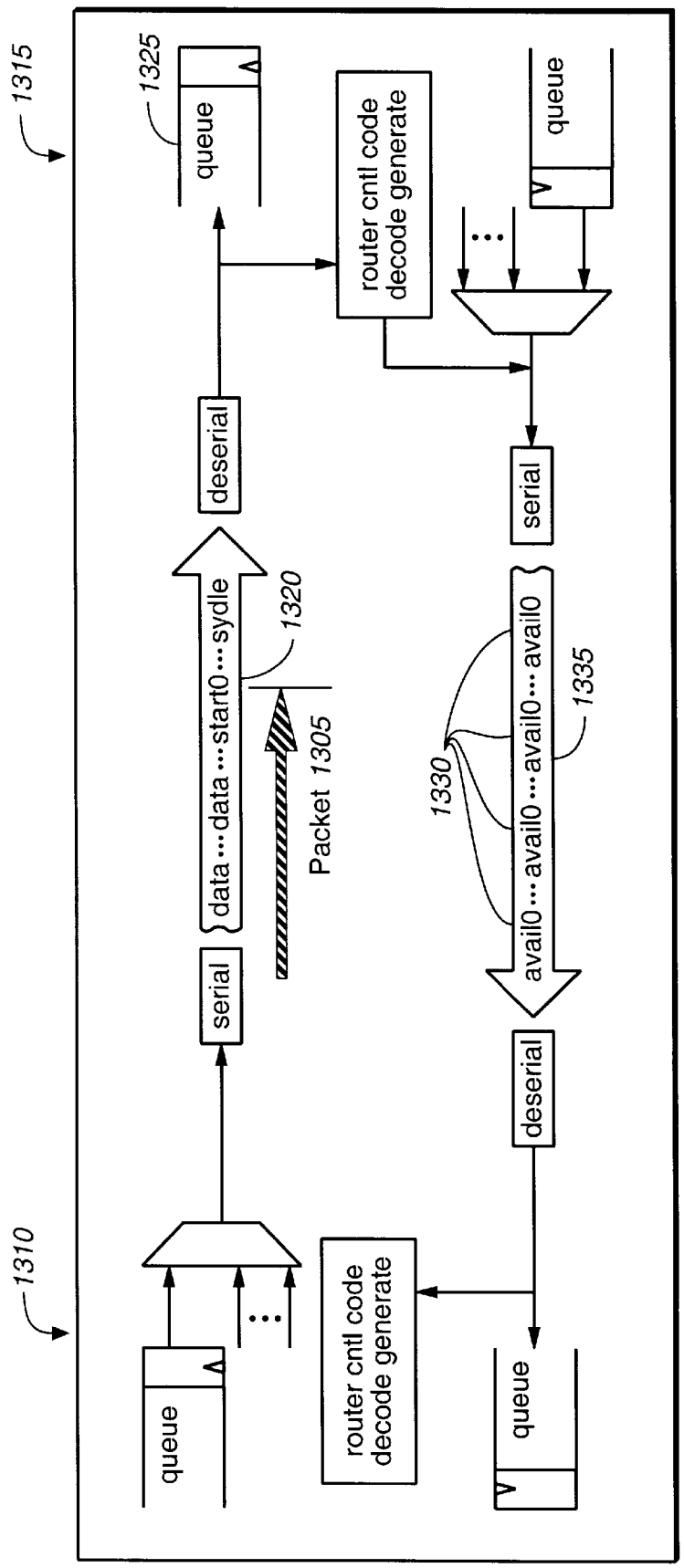
FIG._13

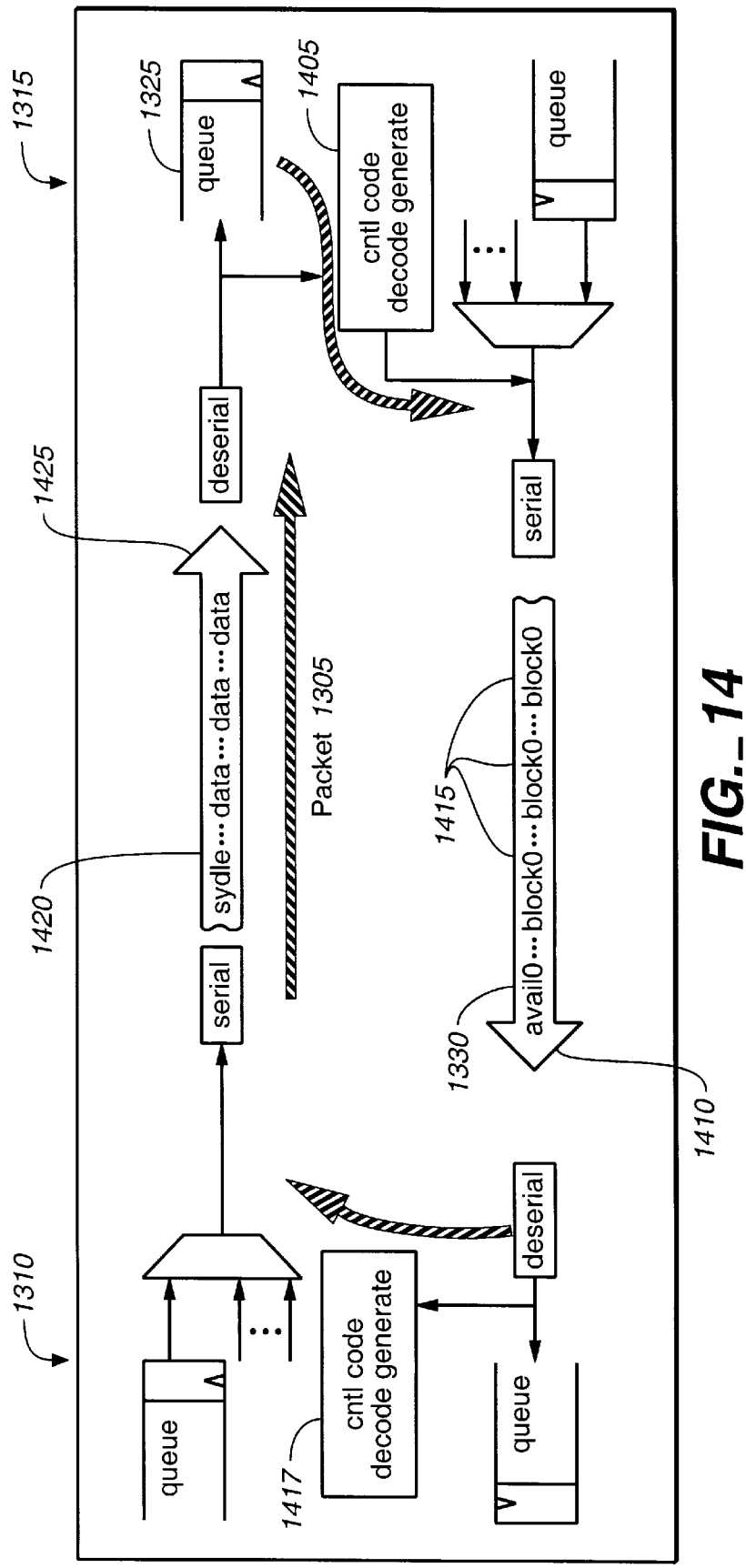
FIG._14

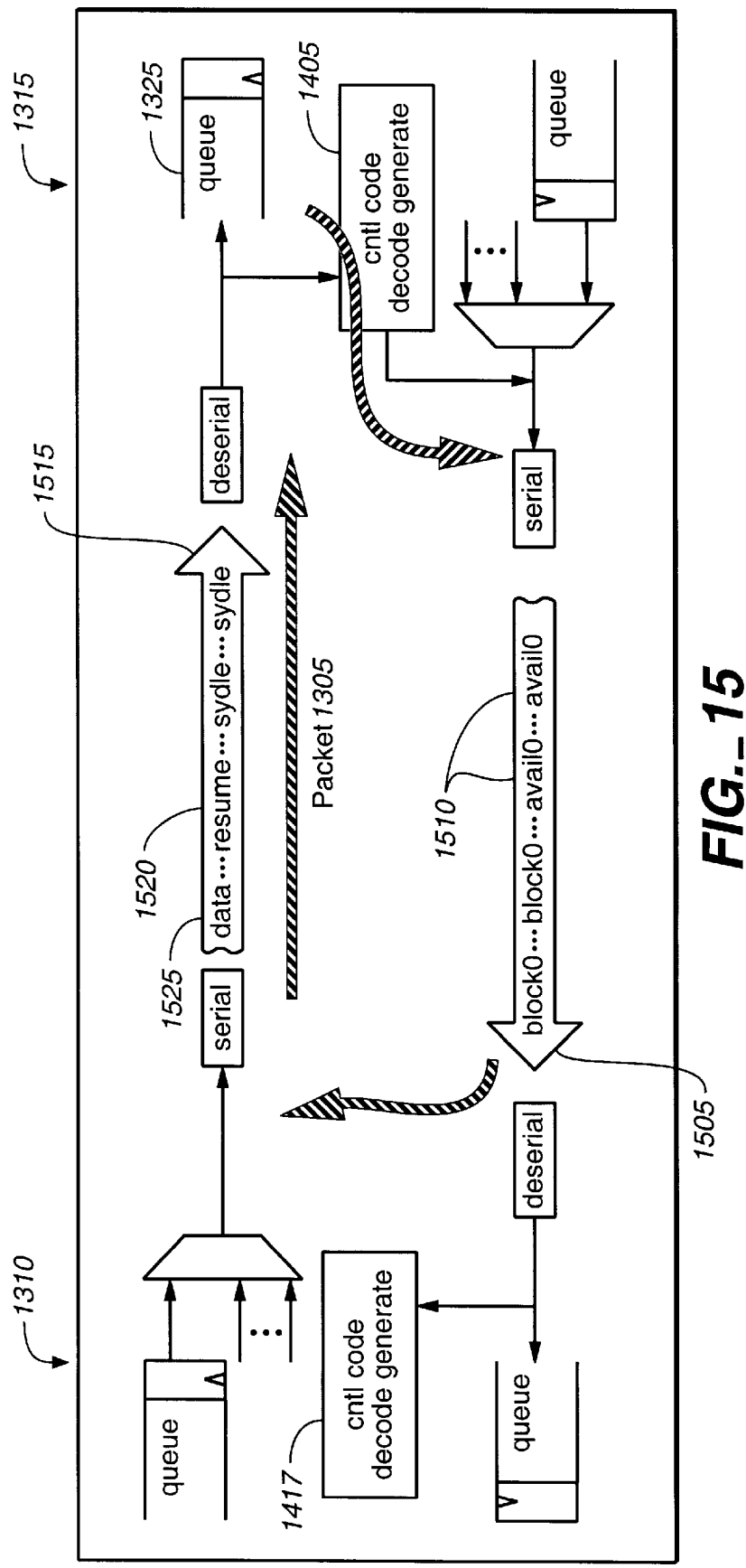
FIG._15

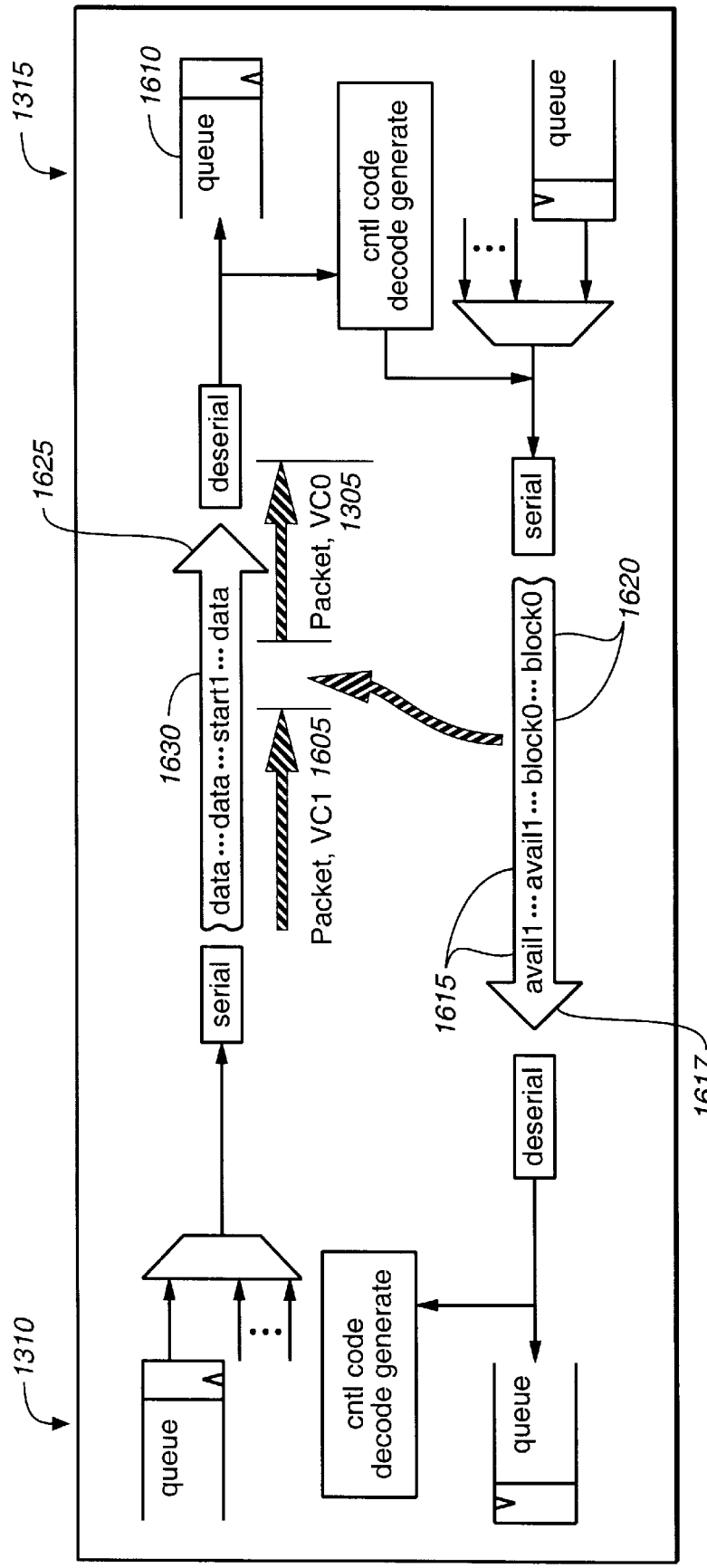
FIG._16

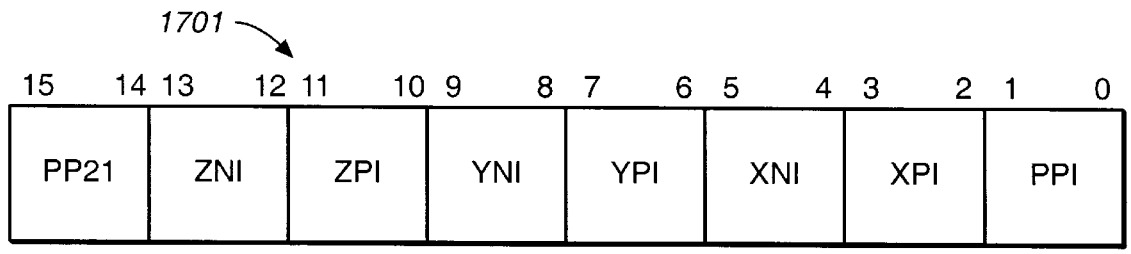
FIG._17A
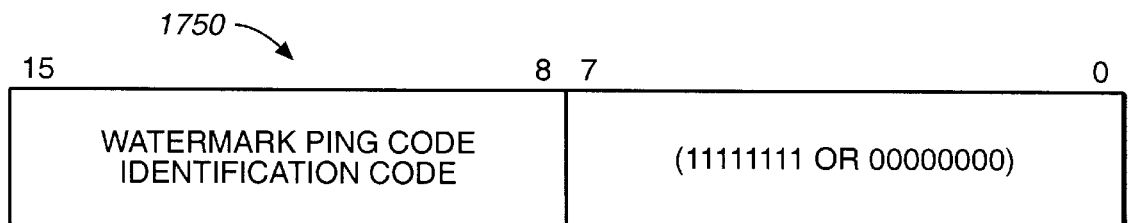
FIG._17C
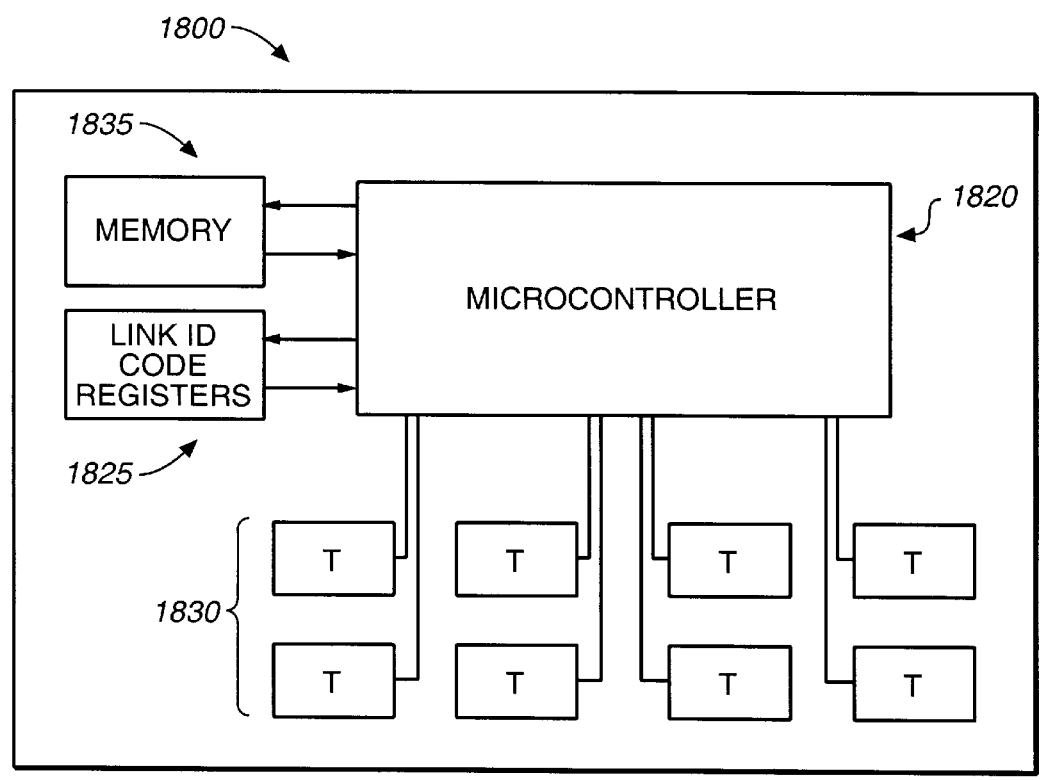
FIG._18

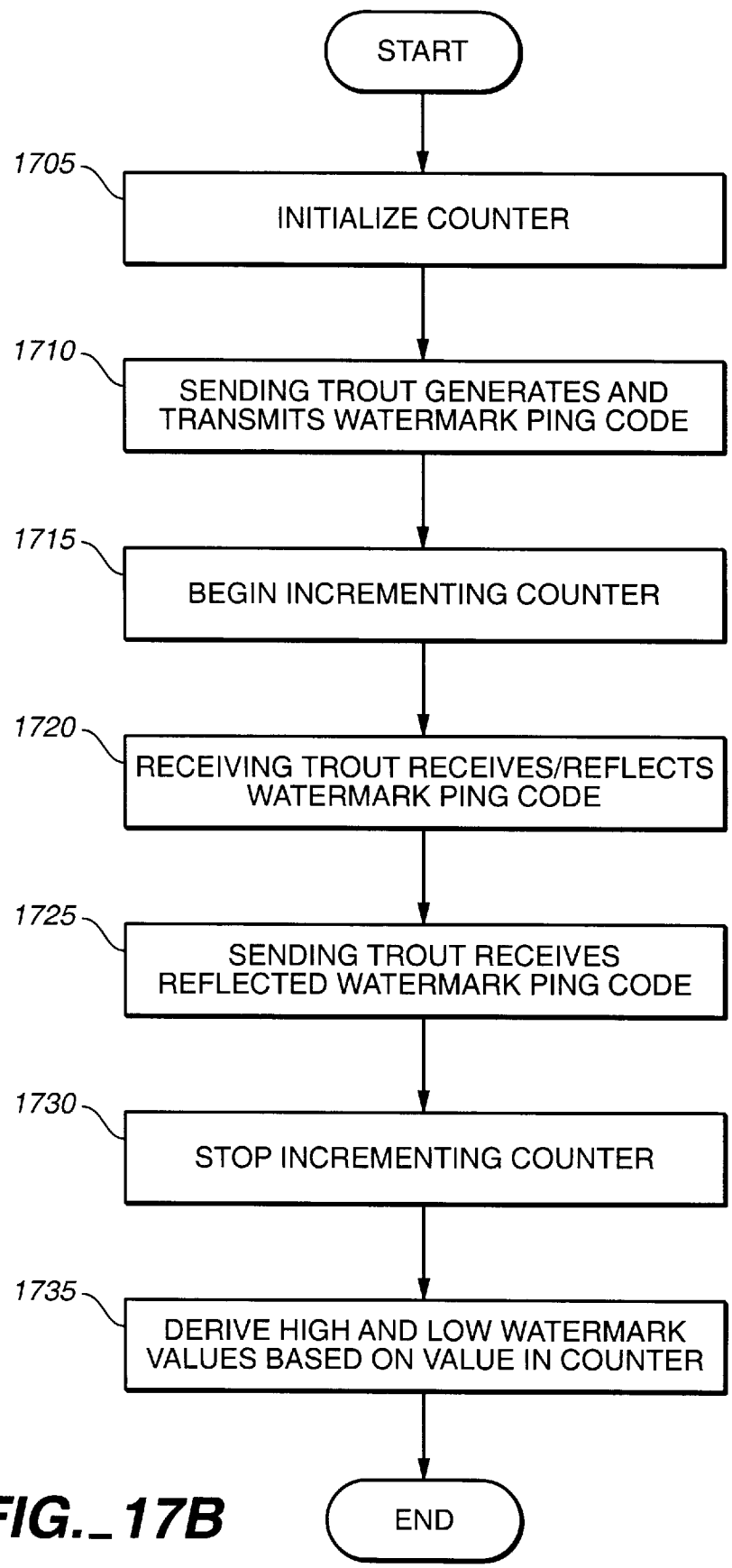
FIG._17B

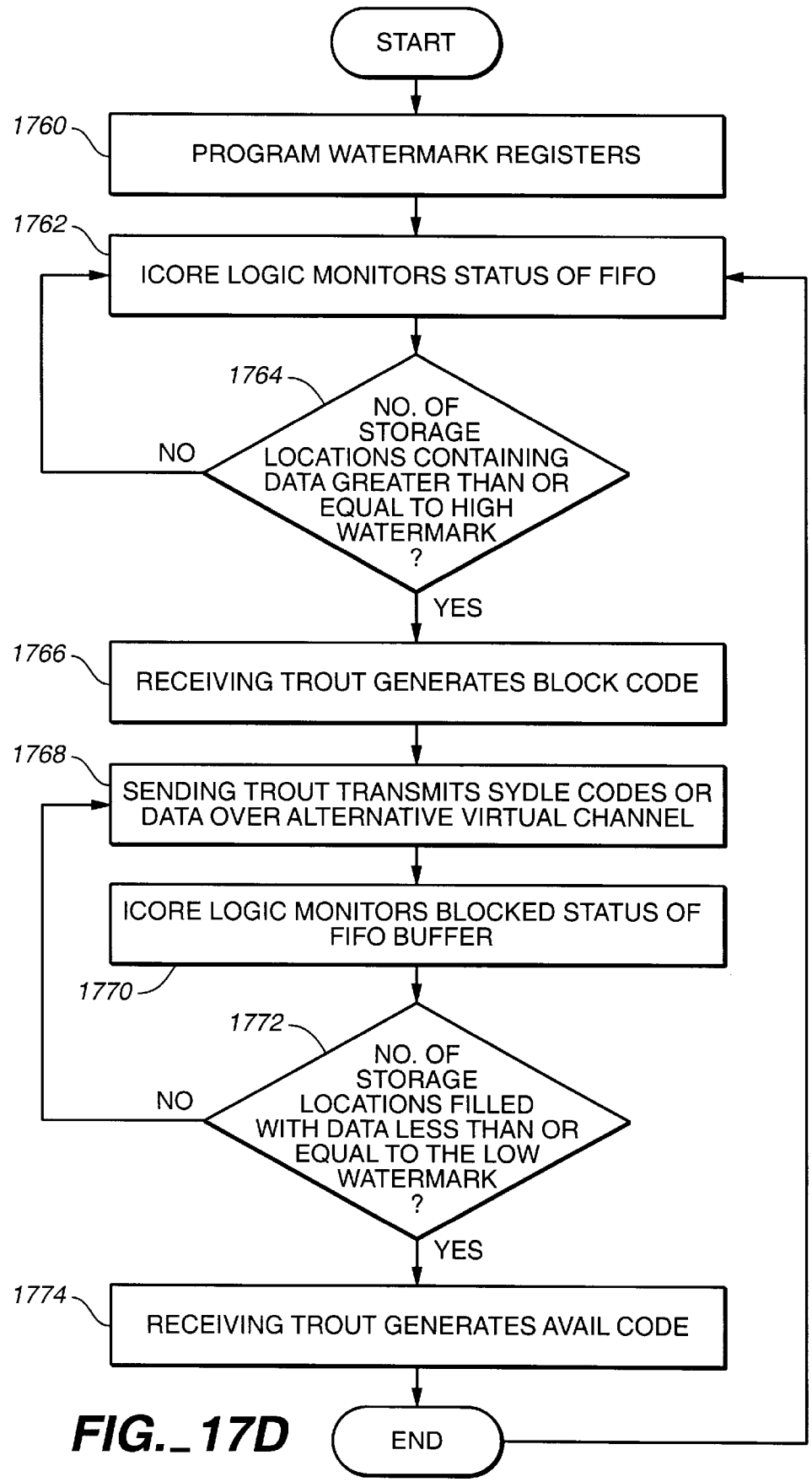
FIG._17D

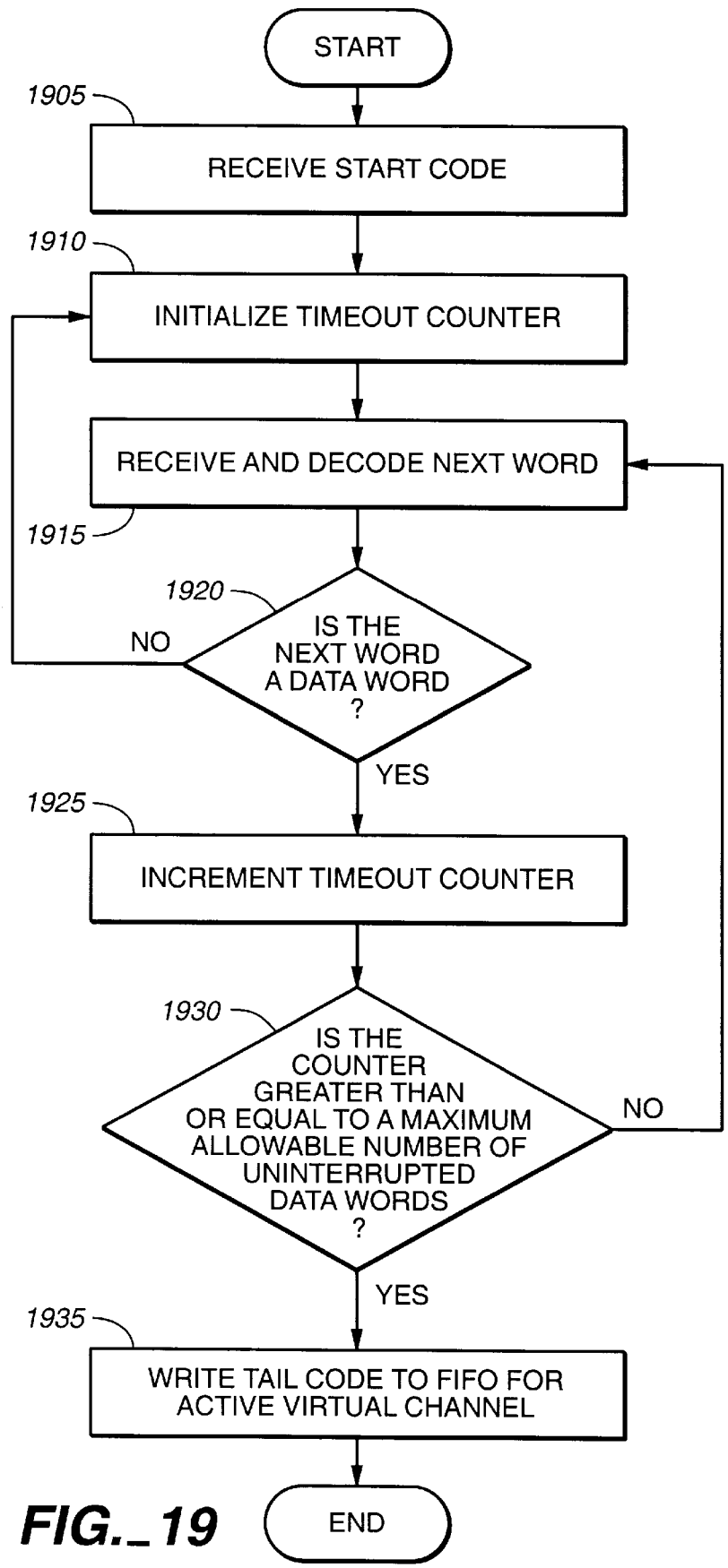
FIG._19

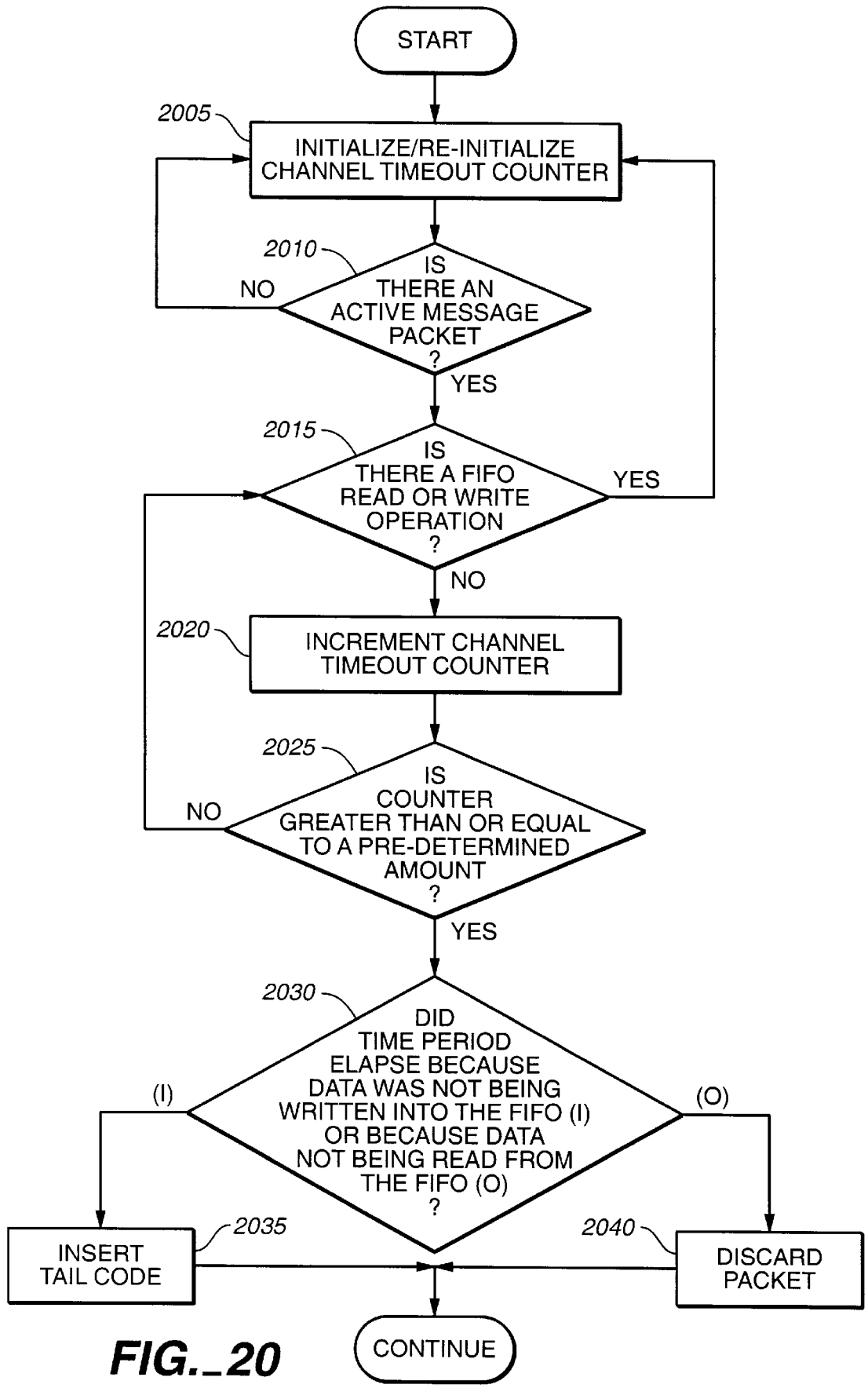
FIG._20

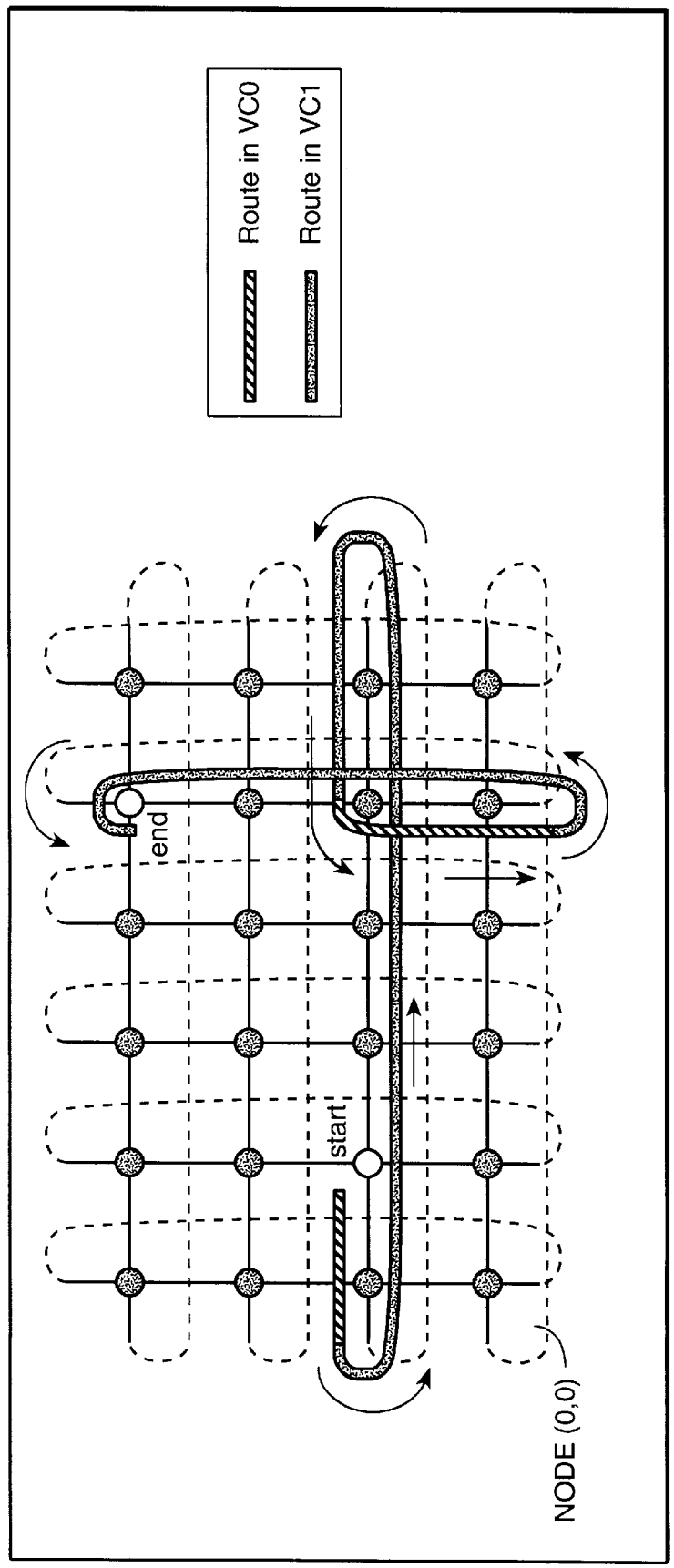
FIG._21

TORUS ROUTING ELEMENT ERROR HANDLING AND SELF-CLEARING WITH PROGRAMMABLE WATERMARKING

FIELD OF THE INVENTION

The present invention relates to the movement of data and control information between nodes in a massively parallel processing (MPP) system, wherein each node represents an independent, concurrently operating computer system. More specifically, the present invention relates to the detection, isolation and resolution of error conditions that may occur at the interconnection between the various nodes in the MPP system, so as to reduce the likelihood that the MPP system, or a portion thereof, will lock-up and be precluded from transmitting message packets between the various nodes.

BACKGROUND

MPP systems are, in general, large-scale computer systems that comprise numerous, often hundreds, of individual, concurrently operating computing entities. The computing entities communicate with one another through a network of corresponding nodes linked together by communication channels. The network is often referred to as a fabric. As one skilled in the art will recognize, the network or fabric can be configured in any one of a number of different topologies.

One rather typical topology, in accordance with prior art, is the rectangular mesh. An example of a 2×4 rectangular mesh 100 is illustrated in FIG. 1.

As shown in FIG. 1, the 2×4 rectangular mesh 100 is essentially a two-dimensional network of nodes 105 which are connected by communication channels 110. Although it is not depicted in FIG. 1, each of the nodes 105 is connected to at least one computing entity. In addition, each of the nodes 105 may have as many as three neighboring nodes.

In accordance with the prior art topology of FIG. 1, data and/or control information is transported from one computing entity to another through the various nodes 105 and communication channels 110, in accordance with a routing protocol. For example, the computing entity at node (0,0) may require data that is stored in the computing entity at node (3,1). In order to obtain that data, the computing entity at node (0,0) sends a message packet to the computing entity at node (3,1) requesting the desired data. The computing entity at node (3,1) responds by transmitting a message packet back to the computing entity at node (0,0) wherein the message packet contains the requested data. In this example, each message packet traverses three intermediate nodes in order to travel from its source node to its destination node.

Another well-known topology is the TORUS. An example of a two-dimensional 2×4 TORUS 200 is shown in FIG. 2. Like the 2×4 rectangular mesh 100, the various nodes 205 are interconnected by communication channels 210, wherein each of the nodes 205 connect to at least one computing entity. However, in contrast with the 2×4 rectangular mesh 100, the outside edges of the TORUS wrap around, as illustrated in FIG. 2. For example, the left outside edge 215 of the node (0,0) wraps around to connect with the right outside edge 220 of the node (3,0), while the bottom outside edge 225 of the node (0,0) wraps around to connect with the top outside edge 230 of the node (0,1). Therefore, each node in the 2×4 TORUS 200, in contrast with each node in the 2×4 rectangle mesh 100, has four neighboring nodes.

The advantage of the TORUS topology over the rectangular mesh topology, as one skilled in the art will understand, is that when transmitting a message packet from a source node to a destination node, the message packet, on average, travels through fewer intermediate nodes, thereby reducing message packet latency and link utilization. This, in turn, results in higher overall through-put in the fabric. For purposes of illustration, if the computing entity at node (3,1) of the 2×4 TORUS 200 transmits a message packet to the computing entity at node (0,0), the message packet need only traverse one intermediate node. It should be readily apparent that the difference between the average number of intermediate nodes traversed in a rectangular mesh topology versus a TORUS topology becomes more exaggerated as the number of nodes increases.

Although FIG. 2 illustrates a two-dimensional TORUS topology, MPP systems are commonly configured as a three-dimensional TORUS. A three-dimensional mesh TORUS topology 300 is illustrated in FIG. 3.

It should also be readily apparent, that in traversing a network, or fabric, from a source node to a destination node, a message packet may take any one of a number of different routes. However, each message packet has a header portion which includes, among other things, an address field. The address field contains information which governs a specific route for the message packet. For example, if the reference number associated with each of the nodes 205 in the 2×4 TORUS 200 in FIG. 2 represents a Cartesian coordinate X and Y, a message packet traveling from the node (0,0) to the node (3,1) might be routed as follows: −1X to the node (3,0), then +1Y to the node (3,1). Alternatively, the message packet might be routed as follows: +2X to the node (2,0), then +1Y to the node (2,1), then +1X to the node (3,1).

To manage and control the flow of message packets within a network or fabric, and to avoid undesirable routing conditions such as "deadlock", MPP systems employ routers or routing elements. Routing elements employed in conjunction with TORUS topologies can be referred to as TORUS routing elements or TROUTS. Generally, there is a routing element or TROUT associated with each node in the fabric, such that each message packet actually traverses the network or fabric from routing element to routing element until the message packet reaches its destination node. Once the message packet arrives at its destination node, the routing element at the destination node removes any overhead and/or control fields from the message packet and transfers the remaining portion of the message packet to the computing entity that corresponds with the destination node. Typically, the message packet is transferred through a computing entity interface device.

Routing elements employed in conjunction with MPP systems are generally well-known in the art. For example, U.S. Pat. No. 5,105,424 describes a system where message packets are routed along pathways from one computing entity to another, wherein each computing entity has a corresponding routing automaton. Each routing automaton has an input for receiving message packets and a plurality of outputs which are selectively chosen based on routing instructions embedded in the header of each message packet. Each routing automaton also includes logic means for reading the routing instructions and for updating the routing information to reflect the passage of the message packet through each automaton.

U.S. Pat. No. 4,933,933 describes a TORUS routing chip which employs two virtual channels between each routing element. The virtual channels are implemented by transmitting more than one message packet on the same physical connection using a time division, multiple access (TDMA) scheme.

The routing elements described in the above-identified and other publications basically provide message packet routing schemes. They do not, however, provide any notable error handling capabilities, despite the fact that error conditions are often fatal, thereby rendering an entire portion of the network or fabric, if not the entire MPP system, inoperative.

"Deadlock" is an example of a message packet routing condition that is generally fatal. Deadlock occurs when a single message packet wraps around the fabric onto itself, thereby blocking its own progress. Deadlock can also occur when two or more message packets block each other. Virtual channels are typically used for preventing deadlock in TORUS and other types of hypercube systems. In prior designs, virtual channels are implemented using a standard time division multiple access (TDMA) scheme. In a standard TDMA scheme, each virtual channel is assigned a corresponding time slot, such that data and control words corresponding to two different message packets can be routed from the same sending TROUT to the same receiving TROUT over the same physical connection, as one skilled in the art will readily appreciate. However, quite often, there is only one message packet being transmitted between a sending TROUT and a receiving TROUT. If this is the case, only 50 percent of the bandwidth associated with the communication link would be utilized. The remaining 50 percent of the bandwidth would be wasted, thereby increasing message packet latency and reducing overall data through-put.

In an academic or research environment, error conditions that might otherwise cause the MPP system, or a portion thereof, to lock-up, or cause message packet latency, are generally not critical to overall operations. In these environments, error conditions can be identified and isolated off-line, and the MPP system can simply be reset. However, with respect to MPP systems that are employed in commercial applications, there is generally far less tolerance for error conditions that cause the system to become locked-up or cause message packet latency. Therefore, a need exists for a routing element design that employs a robust error isolation, identification, and clearing capability to reduce the likelihood that an error condition will render a system, or a portion thereof, inoperative.

SUMMARY OF THE INVENTION

The present invention relates to routing elements that control the transmission of message packets between computing entities in a massively parallel processing (MPP) system. Although the routing elements are described herein below with respect to a three-dimensional MPP system, and more particularly, a MPP system configured in a three-dimensional TORUS topology, many of the attributes associated with the routing elements (i.e., TROUTs) of the present invention could be applied to routing elements used in conjunction with other than three-dimensional and/or non-TORUS MPP topologies.

In view of the foregoing discussion, the present invention recognizes imminent data overflow conditions that are caused by a routing element's inability to handle the quantity of data associated with a message packet, and eliminate and/or minimize the loss of data due to this condition. The present invention also isolates and identifies the source and/or location of an error occurring within the network or fabric. It clears communication channels that are congested with message packets that involve missing, extraneous or corrupted data and control codes, and it prevents or minimizes the occurrence of "deadlock".

A first aspect of the present invention involves a method and/or an apparatus for controlling the transmission of message packet data along a connection between a first routing element and a second routing element. More precisely, the method and/or apparatus involves transmitting data along the connection from the first routing element to a buffer in the second routing element; determining a first pre-programmed quantity based on a period of time required to transmit data along the connection between the first and the second routing elements; and comparing the quantity of data in the buffer to the first pre-programmed quantity. A determination is then made as to whether the first routing element is to be blocked from transmitting additional data to the buffer in the second routing element as a function of the comparison between the quantity of data in the buffer and the first pre-programmed quantity.

A second aspect of the present invention involves a massively parallel processing system, which employs an apparatus and/or a method for controlling data transmission from a first routing element to a buffer in a second routing element. The method and/or apparatus involves generating a high and a low watermark value for the buffer in the second routing element based on a period of time required to transmit data between the first routing element and the second routing element, wherein the high and low watermark values each represent a number of storage locations in the buffer that contain data. The apparatus and/or method then involves comparing a current number of data words stored in the buffer with the high watermark value. If the current number of data words stored in the buffer is greater than or equal to the high watermark value, blocking the first routing element from transmitting additional data words.

BRIEF DESCRIPTION OF THE DRAWINGS

The present invention will be understood by reading the following detailed description in conjunction with the drawings in which:

FIG. 1 illustrates a 2×4 rectangular mesh in accordance with the prior art;

FIG. 2 illustrates a 2×4 TORUS in accordance with the prior art;

FIG. 3 illustrates a three-dimensional mesh in accordance with the prior art;

FIG. 4 is a representation of a routing element according to the present invention;

FIG. 5 shows a three-dimensional configuration of TROUTs;

FIG. 6 shows the internal architecture of a routing element according to the present invention;

FIG. 7 illustrates the flow of data and control codes between neighboring routing elements;

FIG. 8 depicts a typical message packet;

FIG. 9 depicts a START codes;

FIG. 10 depicts an address code;

FIG. 11 depicts a TAIL code;

FIG. 12 depicts a SYNC-IDLE (SYDLE) code;

FIG. 13 illustrates the flow of data and control codes between neighboring routing elements;

FIG. 14 illustrates the flow of data and control codes between neighboring routing elements;

FIG. 15 illustrates the flow of data and control codes between neighboring routing elements;

FIG. 16 illustrates the flow of data and control codes between neighboring routing elements;

FIG. 17A is a 16-bit watermark mapping register;

FIG. 17B is a flowchart illustrating a technique for automatically deriving high and low watermark values;

FIG. 17C is a 16-bit watermark ping code;

FIG. 17D is a flow chart showing a technique that employs a high and low watermark value in accordance with one aspect of the present invention;

FIG. 18 illustrates the architecture of a routing board;

FIG. 19 is a flow chart with respect to another aspect of the present invention;

FIG. 20 is a flow chart with respect to another aspect of the present invention; and FIG. 21 illustrates virtual mesh edge switching according to the present invention.

DETAILED DESCRIPTION OF THE PREFERRED EMBODIMENT

In accordance with the present invention, each TROUT interfaces with six neighboring TROUTs. Accordingly, each TROUT can be represented as illustrated in FIG. 4, wherein each of the six sides of the TROUT 400 contain a pair of communication ports, consists of one input port and one output port through which the TROUT communicates with one of its six neighboring TROUTS. In addition, the TROUT 400 includes one or more pairs of processor ports (not shown). The processor ports are used to transfer information between the TROUT 400 and one or more computing entities associated with the node corresponding to the TROUT 400. As mentioned above, the transfer of information between a routing element and a corresponding computing entity is typically accomplished through a computing entity interface device. Table I summarizes each pair of communication ports depicted in FIG. 4 and the conventions associated therewith.

TABLE I

| ZNI | −Z dimension input | ZPO | +Z dimension output |
|---|---|---|---|
| ZNO | −Z dimension output | ZPI | +Z dimension input |
| XNI | −X dimension input | XPO | +X dimension output |
| XNO | −X dimension output | XPI | +X dimension input |
| YNI | −Y dimension input | YPO | +Y dimension output |
| YNO | −Y dimension output | YPI | +Y dimension input |
| PPI | processing port input | PPO | processing port output |

As stated, the TROUT 400, is intended to be used in conjunction with a MPP system configured as a three-dimensional TORUS. Accordingly, FIG. 5 illustrates a number of TROUTs 400 linked together to form a 6×2×4 TORUS topology. As previously explained, the TORUS differs from the three-dimensional mesh topology in that the top, bottom, right and left edges of the TORUS topology wrap around to form a "donut" shape. For example, in FIG. 5, the communication port YPO (not shown), associated with the right side of TROUT (0,1,0), is connected to the communication port YPI (not shown), associated with the left side of TROUT (0,0,0), by communication link 505. Likewise, the communication port ZNO (not shown), associated with the bottom side of TROUT (0,1,0), is connected to the communication port ZNI which is associated with the top side of TROUT (0,1,3), by communication link 510. Similarly, the communication port XNO, associated with the front side of TROUT (0,1,0), is connected to the communication port XNI, associated with the back side of TROUT (5,1,0), by communication link 515.

FIG. 6 shows the functional elements associated with a TROUT in accordance with a preferred embodiment of the present invention. First, FIG. 6 re-illustrates that each TROUT contains eight input or ICORE ports 605 (i.e., YPI, YNI, XPI, XNI, ZPI, ZNI, PPI and PP2I) and eight output or OCORE ports 610 (i.e., YPO, YNO, XPO, XNO, ZPO, ZNO, PPO and PP2O). Each TROUT also includes an 8×8 crossbar 615. The 8×8 crossbar physically connects any one of the ICORE ports 605 to any one of the OCORE ports 610. Although it is not expressly shown in FIG. 6, the 8×8 crossbar 615 comprises eight 8×1 multiplexers, wherein a single 8×1 multiplexer is associated with each of the OCORE ports 610. Information entering the TROUT through one of the ICORE ports 605 is routed to the appropriate OCORE port through the 8×1 multiplexer corresponding with that OCORE port.

In general, data is transmitted from a sending TROUT to a receiving TROUT via message packets. Under ordinary circumstances, each message packet consists of a number of control codes and a number of data words. A more exact description of a standard message packet is presented below. Upon entering a receiving TROUT through one of the receiving TROUT's ICORE ports 605, the control codes and the data words associated with the message packet are stored in a FIFO, for example FIFO 620, in sequence, as illustrated in FIG. 6. Based on routing instructions contained in the message packet, the TROUT directs the message packet, word by word and code by code, from the FIFO 620 in the ICORE port 605 to the appropriate OCORE port 610. It will be understood that while control codes and data words are being written to the FIFO 620, other, previously stored control codes and data words may be simultaneously read from the FIFO 620 AND ROUTED TO THE APPROPRIATE OCORE PORT 610. More specifically, the routing instructions are decoded by the ICORE logic 625. The ICORE logic 625 then instructs the OCORE logic 630 to generate the control signals necessary to enable the appropriate 8×1 multiplexer in the 8×8 crossbar and to select the appropriate input path into the enabled 8×1 multiplexer, such that the data words and control codes associated with the message packet are transferred from the FIFO 620 in the appropriate ICORE port 605 to the appropriate OCORE port 610.

FIG. 6 also shows that some of the ICORE ports 605 are serial ports, while others are parallel ports. More specifically, the ICORE ports 605 and the OCORE ports 610 corresponding to the X and Y dimensions are serial ports (i.e., YPI, YPO, YNI, YNO, XPI, XPO, XNI, and XNO). Accordingly, additional de-serialization hardware 635 is needed to de-serialize the data words and control codes upon arriving at one of the X or Y dimension ICORE ports. Similarly, additional serialization hardware 640 is needed to serialize the data words and control codes upon exiting one of the X or Y dimension OCORE ports. In contrast, the ICORE and OCORE ports associated with the Z dimension (i.e., ZPI, ZPO, ZNI and ZNO) and the ICORE and OCORE processing ports (i.e., PPI, PPO, PP2I and PP2O) are parallel ports. The preferred embodiment of the present invention employs both serial and parallel ports in order to take advantage of existing commercial hardware. However, one of ordinary skill in the art would consider it obvious to utilize a TROUT with a symmetric input/output (I/O) port design (i.e., a design in which all I/O ports are serial or all I/O ports are parallel) or a TROUT that employs any number of different combinations of serial and parallel I/O ports.

It should be readily apparent from the discussion above that in accordance with a preferred embodiment of the present invention a TROUT can receive a message packet through any one of the above-identified ICORE ports 605 and then transmit the message packet back in the direction from which it came. For example, the TROUT can receive a message packet through ICORE port XPI, then transmit the message packet on the OCORE port XNO which is paired with the ICORE port XPI (see TABLE I). This capability directly supports an information packet routing feature referred to as loopback. Loopback is primarily utilized for fault isolation and fault avoidance, and it is described in greater detail below.

It should be understood that each of the ICORE and OCORE ports 605 and 610, support two virtual channels between neighboring TROUTs. In order to support two virtual channels between each neighboring TROUT pair, each ICORE port 605 comprises two virtual FIFOs, one virtual FIFO for each virtual channel. Physically, there is only one FIFO partitioned between the two virtual channels. In a preferred embodiment, this is implemented with a single dual-port RAM. However, there is a pair of read/write pointers for each virtual channel. In an alternative embodiment, physically separate FIFO's are employed, one FIFO for each virtual channel. Here, two dual-port RAM devices may be utilized, each having a single pair of read/write pointers.

The present invention also employs a greedy TDMA scheme. In accordance with a preferred embodiment of the present invention, a message packet is permitted to take control over the ICORE port 605. Moreover, the message packet is given uninterrupted control over the ICORE port 605 until the message packet has been completely transferred into the appropriate FIFO, or until the message packet, for one reason or another, becomes blocked or runs out of data. Upon the occurrence of either of these two conditions, control may be surrendered to a message packet associated with the other virtual channel. This greedy TDMA scheme provides for more efficient bandwidth utilization and it is also well known in the art.

FIG. 7 shows a constant stream of information transmitted between neighboring TROUTs. FIG. 7 also indicates that there is a stream of information 705 flowing in a positive direction and a stream of information 710 flowing in a negative direction. The positive stream 705 is emanating from one of the OCORE ports 610 associated with the TROUT 715 on the left, and it is being transmitted to the FIFO 620 in one of the ICORE ports 605 associated with the TROUT 720 on the right. If, more specifically, the positive stream 705 is emanating from the OCORE port YPO in the TROUT 715, the data words and control codes associated with the positive stream 705 would be received by the ICORE port YPI in the TROUT 720. In contrast, the negative stream 710 emanates from the OCORE port YNO in the TROUT 720, and is received by the ICORE port YNI in the TROUT 715.

Both the positively flowing information stream 705 and the negatively flowing information stream 710 include control codes generated by the sending TROUT, and message packets generated by a source computing entity. As stated above, under ordinary circumstances, a message packet includes both control codes and data words.

FIG. 8 illustrates, in more detail, the configuration of a typical message packet 800, in accordance with a preferred embodiment of the present invention. As illustrated, the message packet 800 includes a START code 805 and a TAIL code 815. In addition, the message packet 800 includes an address word 810 and a payload 820, wherein the payload 820 contains one or more data words.

FIG. 9 shows, in greater detail, the configuration of a typical 16-bit START code 805, in accordance with a preferred embodiment of the present invention. As one skilled in the art will appreciate, the START code 805 signals the beginning of a message packet. A receiving TROUT recognizes the START code 805 by a START code value 905 which appears in bit positions 15:8. In addition, the START code 805 contains a virtual channel identification code 910, which appears in bit position 0. The virtual channel identification code 910 identifies whether the message packet is being transmitted on virtual channel 0 (VC0) or virtual channel 1 (VC1). As discussed below, the message packet may be switched from one virtual channel to the other several times before the message packet arrives at its destination node. The START 30 code 805 also includes a link count 915 which appears in bit positions 7:1. The computing entity that generates the message packet initializes the link count 915 to zero. As the message packet is routed through each TROUT, the link count 915 is incremented by one. The link count 915 is used for locating the source of the errors during the message packet transmission, as discussed in greater detail below.

FIG. 10 shows, in greater detail, the configuration of a typical 16-bit address code 810 in accordance with a preferred embodiment of the present invention. When a message packet first arrives at a receiving TROUT, the address code 810 is decoded to determine where, if at all, the message packet is to be routed next. This is accomplished by analyzing the X, Y and Z displacement values occupying bit positions 4:0, 8:5 and 13:10 respectively. The X, Y and Z displacement values reflect the remaining X, Y and Z distances that the message packet must travel to reach its destination node.

In a preferred embodiment, a message packet is first routed in the X dimension, either in the positive direction or the negative direction according to the sign bit SN occupying bit position 4. As the message packet passes through each TROUT, the X displacement value is decremented by one. The message packet continues to be routed in the X dimension until the X displacement value is zero. Next, the message packet is routed in accordance with the Y displacement value until it is zero. Then, it is routed in the Z dimension according to the Z displacement value until the Z displacement value is zero.

When all three displacement values are zero, the address code 810 is discarded, and, under ordinary circumstances, the message packet is transferred to the computing entity through one of the processing ports PPO or PP2O, as specified by the processor port select (PP) bit occupying bit position 15. If, however, the loopback (LB) bit occupying bit position 14, is set equal to one, the address code 810 is discarded, and the word immediately following the address code in the message packet is interpreted as a next address code. The message packet is then re-routed in accordance with the X, Y and Z displacement values in this next address code.

As one of ordinary skill in the art will recognize, the address code 810 provides the ICORE logic 625 and the OCORE logic 630 with the necessary information to set and/or reset the appropriate enable and select signals in the 8x8 crossbar 615, thereby directing the message packet from the ICORE port 605 to the correct OCORE port 610. For example, if the X displacement value is a non-zero value and the corresponding sign bit is set equal to one, the ICORE logic 625 and the OCORE logic 630 will cause the message packet to be routed to the OCORE port XPO. If the sign bit is not set equal to one, then the message packet is routed to the OCORE port XNO. If the X displacement value is zero, but the Y displacement value is a non-zero value, the message packet is routed through YPO or YNO depending upon the value of the corresponding sign bit. If the X, Y and Z displacement values all equal zero, the message packet has reached its destination node, and it will be transferred through one of the two processor ports PPO or PP2O, unless the loopback bit LB is set equal to one.

FIG. 11 shows, in greater detail, the configuration of a typical 16-bit TAIL code 815, in accordance with a preferred embodiment of the present invention. The TAIL code 815 signals the end of a message packet. The TAIL code 815 is identified by a TAIL code value 1105 which appears in bit positions 15:8. The TAIL code 815 also contains an error bit 1110 which occupies bit position 7. If an error is detected, the ICORE logic 625 will set the error bit 1110 in the TAIL code 815 equal to one. When the message packet is eventually received by the destination node, the error bit 1110, if set equal to one, notifies the destination node that an error was detected during routing. In addition, the TAIL code 815, like the START code 805, contains a link count 1115. The link count 1115 occupies bit positions 6:0. The link count 1115 is used in conjunction with the link count 915 in the START code 805 for locating the source of errors in the fabric, as suggested above. Again, link count is explained in greater detail below.

In addition to the data words and control codes associated with a message packet, which are generated by the computing entity located at the source node, there are codes generated and inserted into the positive and negative information streams by the TROUT itself. One of these control codes is the sync-idle (SYDLE) code. FIG. 12 shows, in greater detail, the configuration of a typical 16-bit SYDLE code 1200, in accordance with a preferred embodiment of the present invention. The SYDLE code 1200 is identified by a SYNC code ID value 1201 which appears in bit positions 15:8.

The SYDLE code 1200 serves three purposes. The first purpose is serial link synchronization. Whenever the link between two neighboring TROUTs is idle, or if the FIFO 620 at the receiving TROUT is blocked (i.e., the FIFO is for some reason not capable of receiving addition information), the sending TROUT transmits SYDLE codes in order to keep the link between the two neighboring TROUTS synchronized. The sending TROUT continues to transmit SYDLE codes until the link between the two neighboring TROUTs is no longer idle, or until the FIFO 620 is no longer blocked.

For example, referring back to FIG. 7, the link associated with the negative information stream 710 from the TROUT 720 to the TROUT 715 is idle. Accordingly, the TROUT 720 is transmitting SYDLE codes 725 to the TROUT 715 in order to maintain communication link synchronization. Similarly, the link associated with the positive information stream 705 from the TROUT 715 to the TROUT 720 was idle as indicated by SYDLE code 730. However, the link is no longer idle as the TROUT 715 has transmitted a new message packet, the beginning of which is indicated by a START code 735.

The second purpose of the SYDLE code is to transmit the status of a FIFO back to the sending TROUT. This is accomplished by setting or resetting, as the case may be, a virtual channel 0 (VC0) FIFO status bit 1205 or a virtual channel 1 (VC1) FIFO status bit 1210. The VC0 FIFO status bit 1205 and the VC1 FIFO status bit 1210 occupy bit positions 0 and 1 respectively in the SYDLE code 1200 as illustrated in FIG. 12.

For example, FIG. 13 shows a message packet 1305 being transmitted from the TROUT 1310 to the TROUT 1315. In this example, the message packet 1305 is being transmitted over VC0, as indicated by a start0 code 1320. Upon arriving at the ICORE port 625 in the TROUT 1315, the control codes and the data words associated with the message packet 1305 are stored in the FIFO 1325, wherein FIFO 1325 is associated with VC0. However, before the TROUT 1310 transmits data and/or control codes associated with the message packet 1305 to the TROUT 1315, the FIFO 1325 must be available to receive information. As illustrated in FIG. 13, the TROUT 1315 informs the TROUT 1310 that the FIFO 1325 is available by transmitting, AVAIL0 codes 1330 over the negative information stream 1335. An AVAIL0 code is simply a SYDLE code whose VC0 FIFO status bit 1205 is set equal to zero. As long as the TROUT 1310 has information indicating that the FIFO 1325 is available, the TROUT 1310 continues to transmit the message packet 1305 to the TROUT 1315.

However, if the TROUT 1310 begins writing data into the FIFO 1325 faster than the TROUT 1315 can read data out of the FIFO 1325, the FIFO 1325 will begin to fill up. If the FIFO 1325 fills to a point known as the high watermark, the ICORE logic 625 will instruct a control code decoder/generator 1405 to insert into the negative information stream 1410 one or more BLOCK0 codes 1415, as illustrated in FIG. 14. A BLOCK0 code is simply a SYDLE code whose VC0 FIFO status bit 1205 is set equal to one. The BLOCK0 codes 1415 are decoded by a control code decoder/generator 1417 in the TROUT 1310. The BLOCK0 codes inform the TROUT 1310 that the FIFO 1325 is no longer available to receive information. In response, the TROUT 1310 stops transmitting the message packet 1305, and it instructs the control code decoder/generator 1417 to generate and insert into the positive information stream 1425 one or more SYDLE codes 1420. As stated above, the SYDLE codes 1420 keep the link from the TROUT 1310 to the TROUT 1315 synchronized during the period in which the FIFO 1325 is unavailable to receive information.

Referring now to FIG. 15, the amount of information stored in the FIFO 1325 eventually lessens. When the amount of information is reduced to a point known as the low watermark, the ICORE logic 625 in the TROUT 1315 instructs the control code decoder/generator 1405 to generate and insert into the negative information stream 1505 one or more AVAIL0 codes 1510. The AVAIL0 codes 1510 are decoded by the control code decoder/generator 1417 in the TROUT 1310. The AVAIL0 codes 1510 inform the TROUT 1310 that the FIFO 1325 is once again available to receive data associated with the message packet 1305. Accordingly, the control code decoder/generator 1417 inserts into the positive information stream 1515 yet another type of control code called a RESUME code. In FIG. 15, the control code decoder/generator 1417 inserts a RESUME0 code 1520, which specifically informs the TROUT 1315 that the TROUT 1310 has resumed transmitting the message packet 1305 over VC0.

FIG. 16 illustrates that the TROUT 1310 can transmit a second message packet 1605 over VC1 instead of transmitting SYDLE codes 1420 during the period in which the FIFO 1325 is blocked. As shown in FIG. 16, the TROUT 1315 first transmits AVAIL1 codes 1615 to the TROUT 1310 over the negative information stream 1617. The AVAIL1 codes 1615 are SYDLE codes whose VC1 FIFO status bits 1210 are set equal to zero, thus indicating that the FIFO 1610 associated with VC1 is currently available to receive information. In this case, the VC0 FIFO status bit 1205 in the AVAIL1 codes 1615 are also set equal to zero, indicating the FIFO 1325 associated with VC0 is also available. However, when the amount of information stored in the FIFO 1325 reaches the high watermark, the TROUT 1325 begins generating BLOCK0 codes 1620, and inserting them into the negative information stream 1617. The BLOCK0 codes are similar to the AVAIL0 codes 1615, but for the VC0 FIFO status bit 1205 in the BLOCK0 codes 1615 are set equal to one instead of zero, indicating that the FIFO 1325 associated with VC0 is now blocked. In response to the BLOCK0 codes 1620, the TROUT 1310 stops transmitting the message packet 1305, and instead of transmitting SYDLE codes 1420 as illustrated in FIG. 14, begins transmitting the second message packet 1605 over VC1, as indicated by a start1 code 1630.

In practice, the negative information stream, as depicted in FIGS. 7 and 13–16, are identical in all respects. Accordingly, the negative information stream as depicted in FIGS. 7 and 13–16 also transmits message packets in addition to transmitting control codes from TROUT 1315 to TROUT 1310.

The third purpose of the SYDLE code is to provide link identification.

This is accomplished by inserting a link identification value into each SYDLE code 1200, wherein each link has a unique link identification value. More specifically, the link identification value is stored in the link ID nibble 1215, which appears in bit positions 5:2 in FIG. 12. As explained in greater detail below, the link identification value is divided into a number of segments (e.g., four segments). Each segment is then transmitted, in sequence, in a separate SYDLE code. The segment stored in each SYDLE code is identified by the link ID nibble select code 1220, which occupies bit positions 7:6 in FIG. 12.

As stated above, the ability to diagnose, isolate and avoid critical routing errors that might otherwise cause the MPP system, or a portion thereof, to shutdown or lose data is very important. Accordingly, the preferred embodiment of the present invention employs a number of error handling and error clearing features.

In accordance with one aspect of the present invention, a programmable watermarking feature is provided. To summarize, the watermarking feature prevents data loss that may result if a FIFO becomes completely filled before the receiving TROUT can instruct the sending TROUT that the FIFO is blocked. If the FIFO becomes filled before the sending TROUT is instructed to suspend data transmission, the receiving TROUT will be forced to either write over the existing data stored in the FIFO, in which case the existing data will be lost, or ignore the new data, in which case the new data will be lost.

In general, watermarking is well-known in the art. Typically, it involves manually defining both a high watermark value and a low watermark value for each FIFO. The high watermark value corresponds to the number of FIFO storage locations that when filled cause the receiving TROUT to instruct the sending TROUT to suspend data transmission. By suspending data transmission, the receiving TROUT is not forced to write over existing data nor is it forced to ignore newly transmitted data. It also gives the receiving TROUT an opportunity to read data out of the FIFO, thereby reducing the number of storage locations that are filled.

The low watermark value corresponds to the number of FIFO storage locations that when filled cause the receiving TROUT to instruct the sending TROUT to resume data transmission. As one skilled in the art will understand, the high watermark value is greater than the low watermark value.

To prevent inefficient utilization of bandwidth, the high watermark value cannot be set too low. If the high watermark value is set too low, the receiving TROUT will unnecessarily instruct the sending TROUT to suspend data transmission.

Whenever data transmission is unnecessarily suspended there is an inefficient utilization of bandwidth. This, in turn, causes an increased message packet latency rate.

To prevent data loss, the high watermark value cannot be set too high. If the high watermark value is set too high, there may be an insufficient period of time for the receiving TROUT to warn the sending TROUT that the FIFO is no longer available to receive data. Moreover, the amount of time it takes to transmit and receive the necessary control code (i.e., a BLOCK code) significantly varies as a function of path length (e.g., the length of the cable connecting the sending and receiving TROUTs). Therefore, what might be an appropriate high watermark value for one link may not be an appropriate high watermark for another link.

In accordance with this aspect of the present invention, the ICORE logic 625 maintains a 16-bit register 1701, as illustrated in FIG. 17A. The 16-bit register is divided into eight 2-bit watermark registers, one 2-bit watermark register for the FIFO 620 associated with each ICORE port 605. The 2-bit watermark registers act like multiplexers by selecting one of a number of pre-established high and low watermark value pairs. More specifically, each 2-bit value contained in the eight 2-bit watermark registers maps to a location in a memory associated with the receiving TROUT. The memory location, in turn, contains the value(s) for a particular high and low watermark value pair. A 2-bit watermark register can, in general, uniquely identify four different memory locations, hence, four different high and low watermark value pairs. However, in a preferred embodiment, only three different high and low watermark value pairs are maintained: one watermark value pair corresponding to a short cable length (i.e., the length of cable connecting the corresponding ICORE port 605 to the respective sending TROUT), another watermark value pair corresponding to a medium cable length, and yet another watermark value pair corresponding to a long cable length. For example, a 2-bit binary code of 00 might correspond to a short cable length, while a 2-bit binary code of 01 might correspond to a medium cable length, while a 2-bit binary code of 10 ro 11 might correspond to a long cable length. By employing this watermark value mapping feature, a user need not worry about computing appropriate high and low watermark values, or inaccurately computing high and low watermark value pairs. Instead, the user need only be concerned with supplying the system with a relative cable length (i.e., short, medium, or long). The ICORE logic 625 then accomplishes the more cumbersome task of determining an appropriate high and low watermark value pair for FIFO associated with a given connection between adjacent TROUTs.

In an alternative embodiment, the ICORE logic 625 automatically derives (or reaffirms) the high and low watermark values, on a periodic basis, for the FIFO 620 associated with each ICORE port 605. This alternative embodiment provides more accurate high and low watermark values because they are automatically derived based on an actual amount of time required to transmit a message or code along the link between adjacent TROUTS corresponding to the high and low watermark value to be derived.

FIG. 17B illustrates, more specifically, a technique for accomplishing this automatic watermark value selection process. In accordance with step 1705, a counter maintained by the ICORE logic 625 is initialized. The ICORE logic 625 then causes the TROUT (i.e., the sending TROUT) to generate and transmit a watermark "ping" code to a receiving TROUT, as illustrated in step 1710. For example, if the ICORE logic 625 wishes to derive (or reaffirm) the high and low watermark values currently stored for the FIFO 620 associated with ICORE port YPI, the ICORE logic 625 instructs the control code decoder generator 1405 to generate a watermark ping code. The watermark ping code is then transmitted from the OCORE port paired with the ICORE YPI, i.e., OCORE port YNO. The transmission of the watermark ping code triggers the counter, maintained by the ICORE logic 625, to begin incrementing, as shown in step 1715. The receiving TROUT eventually receives the watermark ping code through its ICORE port YPI, and then reflects the watermark ping code back to the sending TROUT, as illustrated in step 1720. The sending TROUT receives the reflected code, as shown in step 1725, though its ICORE port YNI; the ICORE port for which the ICORE logic 625 is deriving the high and low watermark values. The reception of the reflected watermark ping code by the receiving TROUT stops the counter, as illustrated in step 1730. The ICORE logic 625 then utilizes the value stored in the counter to automatically derive the appropriate high and low watermark values for the FIFO corresponding to ICORE port YNI, as shown in step 1735.

The ICORE logic 625 may automatically derive the high and low watermark values in any number of different ways. For example, the ICORE logic 625 may utilize the counter value as a mapping value to point to one or more entries in a look-up table. As one skilled in the art will appreciated, the look-up table entries will contain the high and low watermark values corresponding to the value stored in the counter. In another example, the ICORE logic 625 utilizes the counter value to solve one or more simple equations, which may be implemented in either hardware and/or software. The solution(s) reflects the high and low watermark values.

In a preferred embodiment, the watermark ping code 1750 is a 16-bit code, as illustrated in FIG. 17C. The upper 8 bits contain an 8-bit identification code 1755 which identifies the code as a watermark ping code. The lower 8 bits, for example, might contain all zeros (i.e., "00000000") to specifically identify the watermark ping code as being transmitted from the sending TROUT to a receiving TROUT. In contrast, the lower 8 bits might contain all ones (i.e., "11111111") to specifically identify the watermark code as being reflected by the receiving TROUT.

Once the high and low watermark values are established, the ICORE logic 625 employs the high and low watermark values to prevent the loss of data when the FIFO becomes filled. FIG. 17D shows a technique for employing the high and low watermark values, in accordance with a preferred embodiment of the present invention. Although this technique is described with respect to a single link between two adjacent TROUTs, one skilled in the art will recognize that this technique would be employed for all of the links in the MPP system.

In accordance with step 1760, a pair of watermark registers 635 corresponding to the link associated with, for example, ICORE port YPI is programmed with a high and a low watermark value. More specifically, the user provides the path length information for the physical link connecting the ICORE port YPI at the receiving TROUT and the OCORE port YPO at the sending TROUT. The ICORE logic 625 then maps the path length information to a set of high and low watermark values stored in memory (not shown). The ICORE logic 625 then stores the high watermark value in one half of the watermark register pair 635, and the low watermark value in the other half of the watermark register pair 635. Once step 1760 is accomplished, it need not be repeated unless the path length between ICORE port YPI and OCORE port YPO changes.

In accordance with step 1762, the ICORE logic 625 periodically monitors the status of the two FIFOs (i.e., one FIFO for each virtual channel) associated with ICORE port YPI. The status of the FIFO associated with VC0, for example, is monitored by comparing the number of storage locations in the FIFO that contain data with the high watermark value stored in the watermark register 635. The ICORE logic 625, in accordance with step 1764, then determines whether the number of storage locations that contain data is greater than or equal to the high watermark value. If the number of storage locations that contain data is not greater than or equal to the high watermark value, in accordance with the "NO" path out of the decision block associated with step 1764, the ICORE logic 625 takes no action other than to continue monitoring the status of the FIFO in accordance with step 1762. If, however, the number of storage locations that contain data is greater than or equal to the high watermark value, in accordance with the "YES" path out of the decision block associated with step 1764, the ICORE logic 625, in accordance with step 1766, prompts the control code decoder/generator 1405 in the receiving TROUT to generate a SYDLE code whose VC0 FIFO status bit 1205 is set equal to one (i.e., a BLOCK0 code). In the present example, the SYDLE code is then transmitted from the OCORE port YNO, which is the OCORE port paired with the ICORE port YPI. Upon receiving and decoding this SYDLE code, the sending TROUT suspends data transmission to the receiving TROUT over VC0. The status of the FIFO associated with VC0 is now blocked. As long as the FIFO is blocked, the sending TROUT transmits SYDLE codes to the receiving TROUT, in accordance with step 1768. As explained above, this helps to maintain link synchronization during the period in which the FIFO is blocked. Unlike data words, which are stored in the FIFO, SYDLE codes are simply discarded once they are received and decoded by the receiving TROUT. If, in accordance with step 1768, there is another message packet awaiting transmission over VC1, the sending TROUT may, alternatively, begin or resume transmitting this other message packet over VC1, as illustrated in FIG. 16.

In accordance with step 1770, the ICORE logic 625 continues to periodically monitor the status of the FIFO during the period in which the FIFO is blocked. The ICORE logic 625 accomplishes this by comparing the number of storage locations in the FIFO that contain data to the low watermark value stored in the watermark register 635, and then determining whether the number of storage locations that contain data is less than or equal to the low watermark value. If, in accordance with the "NO" path out of the decision block associated with step 1772, the number of storage locations that contain data remains greater than the low watermark value, the sending TROUT continues transmitting SYDLE codes over VC0, according to step 1768, and the receiving TROUT continues to monitor the blocked status of the FIFO, according to step 1770. However, if, in accordance with the "YES" path out of the decision block associated with step 1772, the number of storage locations in the FIFO containing data has decreased such that the number is now less than or equal to the low watermark value, the ICORE logic 625 prompts the control code decoder/generator 1405 in the receiving TROUT to generate a SYDLE code whose VC0 FIFO status bit is set equal to zero (i.e., an AVAIL0 code), in accordance with step 1774. Again, this code is transmitted through OCORE port YNO to the sending TROUT. The sending TROUT, upon receiving and decoding the AVAIL0 code resumes the transmission of the message packet to the receiving TROUT over VC0.

By establishing both a high watermark value and a low watermark value, the condition triggering the receiving TROUT to generate a BLOCK code (i.e., when the number of FIFO storage locations containing data is greater than or equal to the high watermark value) differs from the condition triggering the receiving TROUT to generate an AVAIL code (i.e., when the number of FIFO storage locations containing data is less than or equal to the low watermark value), thereby creating what is known as a hysteresis effect. The hysteresis effect is desirable. For example, it permits the sending TROUT to continuously and uninterruptedly transmit a message packet to the receiving TROUT even when the average number of FIFO storage locations that contain data hovers between the high and low watermark values. In contrast, if only a single watermark value is defined, a significant amount of bandwidth is wasted as BLOCK and AVAIL codes are generated as the number of FIFO storage locations containing data repeatedly increase and decrease above and below the single watermark value. Thus, establishing two watermark values results in a more efficient utilization of bandwidth.

As stated above, the MPP system may include hundreds of nodes which are connected by hundreds of links (e.g., cables). In another aspect of the present invention, a link identification feature is provided to help ensure that the link between each sending TROUT and each receiving TROUT is correctly configured.

In accordance with the link identification feature, each link is assigned a unique serial number. In addition, the sending TROUT is programmed to insert into the information stream the unique serial number associated with that link. The serial number is then transmitted from the sending TROUT to the receiving TROUT on a regular basis. The serial number is compared with an expected serial number value. If the comparison does not produce a match, a link identification error signal is generated, thereby warning the system operator that the corresponding cable may not be correctly connected. In an alternative embodiment, the link identification code might include data identifying the port direction associated with each link (e.g., XNO, XNI, YNO, YNI).

In a preferred embodiment of the present invention, each serial number is encoded as a 16-bit link identification code, and it is transmitted from the sending TROUT to a receiving TROUT using the SYDLE codes as described above. Since a single SYDLE code does not have 16 bits available to dedicate to the 16-bit link identification code, the 16-bit link identification code is transmitted four bits at a time in four separate SYDLE codes. For example, a first four bit segment of a 16 bit link identification code is stored in the link ID nibble 1215 of a first SYDLE code transmitted from the sending TROUT to the receiving TROUT. The next SYDLE code to be transmitted contains a second four bit segment of the link identification code, and so forth, until all 16 bits of the link identification code have been transmitted. The process continuously repeats itself. The link ID nibble select code 1220 defines which of the four, 4-bit segments of the 16 bit link identification code is stored in a given SYDLE code.

Upon receiving each SYDLE code, the ICORE logic 625 in the receiving TROUT reads the value stored in the link ID nibble select code 1220. Then, based on the value stored in the link ID nibble select code 1220, the ICORE logic 625 cause the 4-bit segment of the link identification code stored in the link ID nibble 1215 to be copied into a corresponding 4-bit portion of a link identification code register. For example, if the link ID nibble select code 1220 indicates that the link ID nibble 1215 contains the four least significant bits of the link identification code, the value stored in the link ID nibble 1215 is copied into the four least significant bit positions of the link identification code register.

FIG. 18 shows, in a preferred embodiment of the present invention, a number of TROUTs, for example eight TROUTs 1830, are co-located on a single routing board 1810. In addition, each routing board 1810 includes a microcontroller 1820. The microcontroller 1820 interfaces with the link identification code registers 1825. There is one link identification code register associated with each of eight ICORE ports (605). There is also a single link identification code register associated with all eight OCORE ports (610) for a total of 9 link identification registers. The microcontroller 1820 periodically reads the contents of each link identification code register 1825 for each of the eight TROUTs 1830. The microcontroller then compares each link identification value stored therein with an expected value stored in the microcontroller memory 1835. If the link identification value read from any of the link identification code register 1825 differs from its expected value, the microcontroller 1820 will set a link identification error flag. In addition, the microcontroller 1820 may generate a message for presentation on a display device (not shown) indicating which link or links are affected.

In accordance with yet another aspect of the present invention, a static data timeout feature is provided. The link between a sending TROUT and a receiving TROUT can fail in a number of different ways. For example, the link can stop transmitting. In this case, the link will lose synchronization and automatically shut down. In another example, the link can transmit static data, wherein the same data word is re-transmitted over and over again. If this occurs, it is as if the sending TROUT is transmitting an infinitely long information packet. This, in turn, causes that portion of the fabric, which is attempting to route the seemingly infinite message packet, to lock-up. Therefore, the purpose of the static data timeout feature is to prevent the fabric, or a portion thereof, from locking-up if a link is transmitting static data.

FIG. 19 illustrates a technique for implementing the static data timeout feature. This technique begins when the FIFO 620 in the receiving TROUT receives a START code, as illustrated in step 1905. Upon decoding the START code, the ICORE logic 625 initializes an internal data timeout counter according to step 1910. The ICORE logic 625 then decodes the next word received by the FIFO 620, as shown in step 1915, and determines whether the next word is a control code or a data word, in accordance with the decision block associated with step 1920. If the ICORE logic 625 determines the next word is not a data word (i.e., that the next word is a control code), in accordance with the "NO" path out of the decision block associated with step 1920, the ICORE logic 625 re-initializes the internal timeout counter according to step 1910. However, if the ICORE logic 625 determines that the next word is a data word, in accordance with the "YES" path out of the decision block associated step 1920, the ICORE logic 625 increments the internal timeout counter, as shown in step 1925. The ICORE logic 625 then determines whether a certain pre-determined number of uninterrupted data words has been received, as illustrated by the decision block associated with step 1930, wherein the pre-determined number reflects a maximum allowable number of data words. If the number of data words received is less than the maximum allowable number of data words, according to the "NO" path out of the decision block associated with step 1930, the ICORE logic 625 checks the next word received by the FIFO 620, as shown in step 1915. However, if the ICORE logic 625 determines that the number of uninterrupted data words is greater than or equal to the maximum allowable number of data words, according to the "YES" path out the decision block associated with step 1930, the ICORE logic 625 causes the control code decoder/generator 1405 to write a TAIL code, with the error bit 1110 set, to the FIFO 620 of the current virtual channel, as illustrated by step 1935, thus terminating the seemingly infinite information packet. Note that once the tail has been inserted, all subsequent data not preceded by a START code is discarded. A more detailed discussion regarding data packets not preceded by a START code is presented below.

In an alternative embodiment, the ICORE logic 625 increments the static data timeout counter every clock cycle, until a control code is received. If the receiving TROUT continues to receive an uninterrupted flow of data words for a pre-determined number of clock cycles, for example 64,000 clock cycles, the ICORE logic 625 generates a static data control signal, which in turn causes a TAIL code to be inserted into the FIFO 620. In either embodiment, the insertion of a TAIL code resets and clears the link, which otherwise would have become locked-up, as all of the data words received subsequent to the TAIL code are discarded since they are not first preceded by a START code.

In accordance with another aspect of the present invention, a channel timeout feature is provided. The channel timeout feature is designed to prevent a message packet from locking-up the fabric if there is a pending message packet associated with the ICORE port 605 and message packet information has not been read from or written to the corresponding FIFO 620 for a predefined period of time. The ICORE logic 625 maintains a single channel timeout counter for each virtual channel, wherein the single timeout counter for each virtual channel is incremented by any clock signal if a message packet is currently pending in the corresponding FIFO 620 and neither a read from the FIFO 620 nor a write to the FIFO 620 during a current clock cycle.

FIG. 20 illustrates a technique for accomplishing the channel timeout feature. At first, the channel timeout counter for a given virtual channel is initialized by the ICORE logic 625, as shown in step 2005. The ICORE logic 625 then monitors the FIFO 620 associated with the virtual channel and determines whether there is a pending message packet, as illustrated in the decision block associated with step 2010. For example, the ICORE logic 625 can set an internal control bit equal to "1" when the corresponding, and otherwise empty FIFO 620 first receives a START code, thus indicating that a message packet is now pending. The control bit would remain equal to "1" until a corresponding TAIL code is read from the FIFO 620, unless, of course, an additional message packet is still pending.

If there is no pending message packet (e.g., the above-identified control bit is equal to "0"), in accordance with the "NO" path out of the decision block associated with step 2010, the ICORE logic 625 re-initializes the channel timeout counter. However, if there is a pending message packet (e.g., the above-identified control bit is set equal to "1"), in accordance with the "YES" path out of the decision block associated with step 2010, the ICORE logic 625 then determines whether data has been written to or read from the FIFO 620 during the current clock cycle, as illustrated in the decision block associated with step 2015. If a read or a write operation has occurred during the clock cycle, in accordance with the "YES" path out of the decision block associated with step 2015, the ICORE logic 625 re-initializes the channel timeout counter as shown in step 2005. However, if a read or write operation did not occur during the clock cycle, in accordance with the "NO" path out of the decision block associated with step 2015, the ICORE logic 625 increments the channel timeout counter as illustrated in step 2020.

The ICORE logic 625 then determines whether a pre-defined period of time has elapsed since the last read or write operation, as illustrated in the decision block associated with step 2025. If the channel timeout counter indicates that the time elapsed since the last read or write operation is less than the predefined period of time, according to the "NO" path out of the decision block associated with step 2025, the ICORE logic 625 waits for the next clock cycle and determines, once again, whether a read or a write operation has occurred, according to the decision block associated with step 2015. If, on the other hand, the channel timeout counter indicates that the time elapsed since the last read or write operation is greater than or equal to the predefined time period, according to the "YES" path out of the decision block associated with step 2025, the ICORE logic 625 then determines whether the link is blocked because data is not being written into the FIFO 620, or whether the link is blocked because data is not being read from the FIFO 620, as illustrated by step 2030.

To determine whether the link is blocked because data is either not being read from the FIFO 620 or because data is not being written to the FIFO 620, the ICORE logic 625 might, for example, determine whether there is data currently stored in the FIFO 620. If, after the predefined time period elapses, there is data stored in the FIFO 620, this tends to indicate that there is a problem reading data from the FIFO 620. If, however, the ICORE logic 625 determines that the FIFO 620 is empty, this tends to indicate that there is a problem writing data into the FIFO 620.

If the ICORE logic 625 determines that the time period elapsed because message packet data is not being written into the FIFO 620 (e.g., the ICORE logic 625 determines that the FIFO 620 is empty), according to the "I" path out of the decision block associated with step 2030, the ICORE logic 625 causes the control code decoder/generator 1405 to write a TAIL code whose error bit 1110 is set equal to one, into the FIFO 620, as shown in step 2035. Alternatively, if the ICORE logic 625 determines that the time period elapsed because message packet data is not being read from the FIFO 620 (e.g., the ICORE logic 625 determines that there is data currently stored in the FIFO 620), according to the "O" path out of the decision block associated with step 2030, the ICORE logic 625 discards the offending message packet, as shown in step 2040.

In accordance with yet another aspect of the present invention, a virtual channel switching scheme is provided for the purpose of deadlock prevention. In accordance with this scheme, certain output ports in each TROUT may be designated as edge links. Designating an output port as an edge link alters the way in which message packets are switched from one virtual channel to another. Table II more specifically defines the virtual channel switching scheme in accordance with a preferred embodiment of the present invention.

TABLE II

| Edge Link | Input VC | Turning? | Output VC | Error? |
|---|---|---|---|---|
| No | 0 | Yes | 0 | No |
| No | 0 | No | 0 | No |
| No | 1 | Yes | 0 | No |
| No | 1 | No | 1 | No |
| Yes | 0 | Yes | 1 | No |
| Yes | 0 | No | 1 | No |
| Yes | 1 | Yes | 1 | No |
| Yes | 1 | No | — | Yes |

In accordance with this aspect of the present invention, all message packets enter the fabric on VC0. The message packet continues to be routed from one TROUT to the next on VC0 until it reaches an output port designated as an edge link. The message packet is then switched from VC0 to VC1. The message packet continues to be routed on VC1 unless the routing instructions specify that the message packet must turn (i.e., begin routing along another dimension) at an output port that is not designated as an edge link. If the routing instructions specify that the message packet is turning at an output port that is not designated as an edge link, the message packet is switched from VC1 back to VC0. To prevent a message from wrapping back around on itself, or onto another message packet, thereby causing the fabric to become deadlocked, the ICORE logic 625 discards any message packet, in its entirety, if the routing instructions specify that a message packet is to pass through the same edge more than once. For example, if the message packet is being routed over VC1 and the routing instructions specify that the message packet is to be transmitted directly through an edge link without turning, the ICORE logic 625 recognizes the deadlock potential and discards the message packet.

For example, FIG. 21 shows an example route from a node (1,1) to a node (4,3) in a two-dimensional 6×4 TORUS. The message packet enters the fabric at node (1,1) on VC0. Routing in the X dimension first, and in accordance with the routing instructions in the address word, the message packet travels −1 in the X dimension, to node (0,1). The link between node (0,1) and node (5,1) is designated as an edge link; therefore, the message packet switches to VC1 where it remains for the rest of the route in the X dimension. At node (4,1), the message packet is finished traversing the X dimension. It now must begin traversing the Y dimension. Since the message packet changes routing directions at node (4,1), and because node (4,1) does not contain an edge link, the message packet switches back to VC0. The message packet is then routed in the −Y dimension from node (4,1) to node (4,0), and then from node (4,0) to the destination node (4,3). Since the link between node (4,0) and node (4,3) is designated as an edge link, the message packet switches from VC0 back to VC1.

Alternatively, one skilled in the art will readily understand, the routing instructions could have routed the message packet from node (1,1), in the +X dimension, to node (4,1), and then from node (4,1) to node (4,3) in the +Y dimension. Although the alternative route would entail the same path length as the path length described above, the message packet would be routed exclusively on VC0, as there are no edge links to traverse.

In accordance with another aspect of the present invention, a loopback feature is provided. The loopback feature in actuality is a multi-stage routing feature. For example, if the loopback (LB) bit in an address word, for example address word 1000, is set equal to 1, the receiving TROUT located at the destination node interprets the word immediately following the address word in the message packet as a next address word. The first address word is discarded and the message packet is re-routed to a new destination node in accordance with the X, Y and Z displacement values in the next address word.

In a preferred embodiment of the present invention, the loopback feature can be employed for diagnosing error conditions that may exist along a particular path through the fabric. For example, the next address word may define the original source node as the new destination node. Accordingly, the message packet, upon arriving at the first destination node, is rerouted back to the original source node (i.e., the new destination node) along the same path. A particular link along the route causing transmission errors can often be identified and isolated by re-traversing the same route and determining whether that link caused the error bit 1110 in the TAIL code of the message packet to be set equal to one or whether that link caused a message packet to be discarded. The loopback feature can also be employed for routing message packets around known holes or defects in the fabric.

In accordance with still another aspect of the present invention, a missing and extraneous control code identification feature is provided. As explained above, a message packet ordinarily comprises a START code, followed by at least one address word, one or more data words, and finally, a TAIL code. In addition, a TROUT may generate one or more other codes, such as SYDLE codes and/or RESUME codes. However, transmission errors and/or decoding errors can occasionally result in missing or extraneous control codes. The purpose of the missing and extraneous control code identification feature is to prevent the fabric from locking-up if one or more control codes are missing or are erroneously inserted into the information stream.

If the missing or extraneous control code is a SYDLE code, the action taken by the receiving TROUT to prevent lock-up depends upon the nature of the SYDLE code and/or the status of the FIFO in the receiving TROUT. First, if a SYDLE code should have been generated by a receiving TROUT to instruct the sending TROUT that the amount of data stored in the FIFO has reached the high watermark, or if a SYDLE code is accidentally generated with one of its FIFO status bits 1205 or 1210 set equal to zero, thus erroneously instructing the sending TROUT that the FIFO in the receiving TROUT is available, when in fact it is not available, the sending TROUT will continue to transmit data to the receiving TROUT. If the sending TROUT finishes sending all of the data associated with a message packet before the FIFO reaches it true maximum storage capacity, then neither the omission of the SYDLE code nor the erroneous generation of the SYDLE code as set forth above will adversely affect the transmission of the message packet. However, in a preferred embodiment of the present invention, if the FIFO reaches its true maximum storage capacity before the sending TROUT finishes transmitting the message packet, the receiving TROUT will disregard additional data transmitted by the sending TROUT. In an alternative embodiment, the receiving TROUT may receive the additional data transmitted by the sending TROUT, and overwrite data already stored in the FIFO. This alternative embodiment is generally less desirable because it is possible that several message packets are being stored in the FIFO at a given time. If the receiving TROUT overwrites existing data, there is a chance that the data associated with an otherwise uncorrupted and previously stored message packet will be overwritten and corrupted. By simply disregarding additionally transmitted data, the integrity of an otherwise uncorrupted and previously stored message packet is preserved. In either case, the receiving TROUT will either timeout or insert a TAIL code to clear the link of the now corrupted message packet, and in doing so, prevent the system from locking-up.

Second, if a SYDLE code should have been generated by the receiving TROUT to instruct the sending TROUT that the FIFO in the receiving TROUT is available, or if a SYDLE code with its FIFO status bit 1205 or 1210 set equal to one is accidentally generated by the receiving TROUT and transmitted to the sending TROUT, thereby erroneously instructing the sending TROUT that the FIFO in the receiving TROUT is blocked or unavailable to receive additional data, the sending TROUT will temporarily suspend data transmission. The sending TROUT resumes data transmission upon receiving the next valid SYDLE code. Although the temporary suspension of data transmission may increase message packet latency, neither the omission of the SYDLE code nor the accidental generation of the SYDLE code as set forth above will result in system lock-up.

If the missing or extraneous control code is a START code, the action taken by the receiving TROUT depends upon whether the START code is missing (i.e., whether the beginning of a message packet is not announced) or extraneous (i.e., whether the start of a new message packet is incorrectly announced). In the case where the START code is missing, any message packet that is not proceeded by a START code is discarded. Accordingly, the ICORE logic 625 in the receiving TROUT discards all data and control codes until the next tail or START code is received. While the corrupted message packet is lost, the system is prevented from locking-up. In the event that an extraneous START code is received during the transmission of a message packet, the ICORE logic 625 causes the control code decoder/generator 1405 to generate a TAIL code, whose error bit 1110 is set equal to one. The ICORE logic 625 then truncates the message packet by inserting the TAIL code into the message packet. One skilled in the art will recognize that the extraneous START code effectively creates a new message packet, wherein the word following the START code is interpreted as an address word. The erroneous route defined by the "address word" could result in deadlock, but timeout protection should remove the offending packet.

If the missing or extraneous control code is a TAIL code, the action taken by the receiving TROUT also depends upon whether the TAIL code is missing or whether the TAIL code is extraneous. If the TAIL code is missing one of two things will occur: another packet with a START code will arrive, or the first packet will be "timed-out." In either case, the ICORE logic 625 inserts a TAIL code for the corrupted message packet with the error bit set equal to one. If the TAIL code is extraneous, the message packet will be prematurely truncated. The truncated message packet is then transmitted to the destination node, where the error is detected by the computing entity, or more specifically, by the computing entity interface device, which typically applies an error check, such as a CRC check to the message packet, as one skilled in the art will readily understand.

If the missing or extraneous code is not a control code, but rather a data word, the receiving TROUT will, in the event of a missing data word (i.e., a message packet that is shortened by one data word) or an extraneous data word (i.e., a corrupted SYDLE code or other control code appears in the message packet as an extra data word), route the message packet towards its intended destination node. It is then left to the computing entity interface device to detect the error using error detection techniques such as CRCs and packet length checks. If the extraneous data word appears after a TAIL code is received, the ICORE logic 625 discards it, since it is not properly proceeded by a START code.

In still another aspect of the present invention, a timestamp feature is provided for the purpose of establishing the source of an error. As stated above, a MPP system may involve hundreds of nodes. Traditionally, each node employed its own clock running off of its own crystal. If an error affecting numerous TROUTs occurred, it was difficult to ascertain the TROUT in which the error first occurred because the clocks were asynchronous.

In contrast, a preferred embodiment of the present invention includes a common timestamp clock connected to each TROUT in the MPP. In addition, each TROUT maintains a timestamp counter. The timestamp counters are responsive to the common timestamp clock; therefore, the counters are synchronized with respect to each other. Each TROUT also maintains a timestamp register. The timestamp registers shadow the timestamp counters until an error is detected. When an error (e.g., a message packet transmission error) is detected by a particular routing element, the value in the timestamp register associated with that routing element is "frozen", thereby storing the value of the timestamp counter at the time of occurrence (i.e., the time the routing element detects the error). If, for example, a static data timeout error occurs, and the error effects a number of TROUTs, each at a different time, the timestamp registers associated with those multiple TROUTs can be used to determine the source of the error (i.e., the routing element which detects the error) by determining the routing element associated with the earliest time of occurrence.

In a preferred embodiment, the timestamp counter is a 32 bit counter comprised of four, 8-bit counters that are cascaded together. The timestamp counter is initially set equal to zero. The counter then increments by one with each rising edge of the common timestamp clock. The timestamp counter remains enabled until any of the lowest three 8-bit registers are written to a corresponding portion of the timestamp register. The counter remains disabled until the most significant 8-bit counter is written to the timestamp register. This procedure allows a value to be loaded into the timestamp register without any concern that the value in the timestamp counter will be prematurely altered.

In another aspect of the present invention, a link count feature is provided. The link count feature provides the ability to establish the location or source of an error (e.g., the identity of a routing element along the message packet transmission path that first encounters a message packet error).

As stated above, both the START code, as illustrated in FIG. 9, which is appended to the beginning of each message packet, and the TAIL code, as illustrated in FIG. 11, which is appended to the end of each message packet, contain a link count field 915 and 1115 respectively. When a message packet first enters the fabric (i.e., when the START code is received by the first routing element), the link count field 915 in the START code is incremented by one from its initial value (e.g., an initial value of zero). As the message packet traverses the mesh fabric along its transmission path, the link count field 915 continues to be incremented by one each time the START code is received by a routing element. Therefore, when the message packet is received by the destination node (i.e., the last routing element along the transmission path), the link count field 915 should reflect the exact number of links (i.e., TROUTs) traversed.

In a similar manner, the link count field 1115 in the TAIL code is incremented by one each time the TAIL code is received by a routing element along the transmission path. However, if a routing element encounters or detects a message packet error when receiving the message packet, the error bit 1110 in the TAIL code is set equal to one in addition to incrementing the link count field 1115. Once the error bit 1110 is set equal to one, the link count field 1115 is prevented from being incremented any further as the message packet traverses the remaining portion of the transmission path.

If the message packet error results in the insertion of a new TAIL code, for example, if the message packet is erroneously truncated, wherein the routing element that first encounters the message packet error fails, the ICORE logic 625 will copy the value of the link count field 915 into the link count field 1115 in the new TAIL code. It will also set the error bit 1110 to equal one. Once again, by setting the error bit 1110, the link count field 1115 in the new TAIL code is prevented from being incremented any further as it traverses the remaining portion of the transmission path along with the rest of the corrupted message packet.

When the now corrupted message packet reaches the destination node, the routing element which first encountered the message packet error can be identified by analyzing the transmission path traversed by the message packet, which is defined by the routing data stored in the address word illustrated in FIG. 10 and the value of the link count field 1115. By tracing the transmission path, as defined by the routing data, from the first routing element a number of routing elements equal to the link count field 1115, the routing element that first encountered the message packet error can be identified. Alternatively, the routing element that first encountered the message packet error can also be identified by tracing the transmission path in the reverse direction from the destination node a number of routing elements equal to the difference between the link count field 915 and the link count field 1115.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for controlling the transmission of message packet data along a connection between a first routing element and a second routing element comprising the steps of:

transmitting data along the connection from the first routing element to a buffer in the second routing element;

determining a first pre-programmed quantity based on a period of time required to transmit data along the connection between the first and the second routing elements;

comparing the quantity of data in the buffer to the first pre-programmed quantity; and blocking the first routing element from transmitting additional data to the buffer in the second routing element as a function of the comparison between the quantity of data in the buffer and the first pre-programmed quantity.

2. The method of claim 1 further comprising the steps of:

after blocking the first routing element from transmitting data to the second routing element, comparing the quantity of data in the buffer to a second pre-programmed quantity;

unblocking the first routing element if the quantity of data in the buffer is less than or equal to the second pre-programmed quantity, wherein the second pre-programmed quantity is less than the first pre-programmed quantity.

3. The method of claim 2 further comprising the step of:

determining the second pre-programmed quantity based on a period of time required to transmit data along the connection between the first and the second routing elements.

4. The method of claim 2, wherein the buffer is a FIFO.

5. The method of claim 4, wherein the quantity of data reflects a number of FIFO storage locations that contain data.

6. In a massively parallel processing system, a method for controlling data transmission from a first routing element to a buffer in a second routing element comprising the steps of:

generating a high and a low watermark value for the buffer in the second routing element based on a period of time required to transmit data between the first routing element and the second routing element, wherein the high and low watermark values each represent a number of storage locations in the buffer that contain data;

comparing a current number of data words stored in the buffer with the high watermark value; and if the current number of data words stored in the buffer is greater than or equal to the high watermark value, blocking the first routing element from transmitting additional data words.

7. The method of claim 6, wherein said step of generating a high watermark value based on the time period required to transmit data between the first and the second routing elements comprises the steps of:

transmitting a first control code from the second routing element to the first routing element;

transmitting a second control code from the first routing element to the second routing element;

measuring the time period required to transmit the control code to the first routing element and to retransmit the control code to the second routing element; and determining the high and low watermark values based on the measured time period.

8. The method of claim 7, wherein said step of determining the high and low watermark values based on the measured time period comprises the step of:

establishing the high and low watermark values by using the measured time period as a mapping value to point to the high and low watermark values stored in a look-up table.

9. The method of claim 7, wherein said step of determining the high and low watermark values based on the measured time period comprises the step of:

establishing the high and low watermark values by utilizing the measured time period to solve an arithmetic expression which yields the high and low watermark values.

10. The method of claim 6 further comprising the steps of:
after blocking the first routing element from transmitting data to the second routing element, comparing the number of data words stored in the buffer to the low watermark value; and if the number of data words stored in the buffer is equal to or less than the low watermark value, unblocking the first routing element from transmitting data to the second routing element, wherein the low watermark value is less than the high watermark value.

11. The method of claim 10, wherein the high watermark value represents a first number of storage locations in the buffer which is less than a maximum number of storage locations in the buffer, and the low watermark value represents a second number of storage locations in the buffer which is less than the first number of storage locations.

12. The method of claim 11, wherein said step of unblocking the first routing element from transmitting data to the second routing element comprises the step of:
dispatching a code from the second routing element to the first routing element that indicates the buffer is available to receive data.

13. The method of claim 6, wherein the step of blocking the first routing element from transmitting additional data words comprises the step of:
transmitting a code from the second routing element to the first routing element indicating that the buffer is not available to receive additional data.

14. The method of claim 6, wherein the buffer is a FIFO.

15. An apparatus for controlling the transmission of message packet data along a connection between a first routing element and a second routing element comprising:
output means for transmitting data along the connection from the first routing element to a buffer in the second routing element;

means for determining a first pre-programmed quantity based on a period of time required to transmit data along the connection between the first and the second routing elements;

control logic means in the second routing element for comparing a quantity of data in the buffer to the first pre-programmed quantity; and code generator means in the second routing element for generating a code to block the first routing element from transmitting additional data to the buffer in the second routing element, wherein said code generator means is responsive to said control logic means and the comparison between the quantity of data in the buffer and the first pre-programmed quantity.

16. The apparatus of claim 15 further comprising:
after blocking the first routing element from transmitting data to the second routing element, second control logic means for comparing the quantity of data in the buffer to a second pre-programmed quantity, wherein the code generator means generates a code for unblocking the first routing element if the quantity of data in the buffer is less than or equal to the second pre-programmed quantity, and wherein the second pre-programmed quantity is less than the first pre-programmed quantity.

17. The apparatus of claim 16 further comprising:
means for determining the second pre-programmed quantity based on a period of time required to transmit data along the connection between the first and the second routing elements.

18. The apparatus of claim 16, wherein the buffer is a FIFO.

19. The apparatus of claim 18, wherein the quantity of data reflects a number of FIFO storage locations that contain data.

20. In a massively parallel processing system, an apparatus for controlling data transmission from a first routing element to a buffer in a second routing element comprising:
selection means for determining a high and a low watermark value for the buffer in the second routing element based on a period of time required to transmit data between the first routing element and the second routing element, wherein the high and low watermark values each represent a number of storage locations in the buffer that contain data;

logic means for comparing a current number of data words stored in the buffer with the high watermark value; and if the current number of data words stored in the buffer is greater than or equal to the high watermark value, code generation means for generating a code to block the first routing element from transmitting additional data words to the second routing element, wherein said code generation means is responsive to said logic means.

21. The apparatus of claim 20, wherein said selection means for determining the high and the low watermark values based on a the time period required to transmit data between the first and the second routing elements comprises:
means for transmitting a control code from the second routing element to the first routing element;

means for retransmitting the control code from the first routing element to the second routing element;

counter for measuring the time period required to transmit the control code to the first routing element and to retransmit the control code to the second routing element; and means for determining the high and low watermark values based on the measured amount of time.

22. The apparatus of claim 21, wherein said selection means for determining the high and low watermark values based on the measured time period required to transmit data between the first and the second routing elements further comprises:
means for establishing the high and low watermark values by using the measured time period as a mapping value to point to the high and low watermark values stored in a look-up table.

23. The apparatus of claim 21, wherein said selection means for determining the high and low watermark values based on the measured time period required to transmit data between the first and the second routing elements further comprises:
means for establishing the high and low watermark values by utilizing the measured time period to solve an arithmetic expression which yields the high and low watermark values.

24. The apparatus of claim 20 further comprising:
after blocking the first routing element from transmitting data to the second routing element, second logic means for comparing the number of data words stored in the buffer to the low watermark value, wherein said code generation means includes means for generating a code to unblock the first routing element if the number of data words stored in the buffer is equal to or less than the low watermark value, and wherein the low watermark value is less than the high watermark value.

25. The apparatus of claim 24, wherein the high watermark value represents a first number of storage locations in the buffer which is less than a maximum number of storage locations in the buffer, and the low watermark value represents a second number of storage locations in the buffer which is less than the first number of storage locations.

26. The apparatus of claim 25, wherein said code generation means further comprises:

means for dispatching a code from the second routing element to the first routing element that indicates the buffer is available to receive data.

27. The apparatus of claim 20, wherein said code generation means further comprises:

means for transmitting a code from the second routing element to the first routing element indicating that the buffer is not available to receive additional data.

28. The apparatus of claim 20, wherein the buffer is a FIFO.

29. A method for controlling the transmission of message packet data along a connection between a first routing element and a second routing element comprising the steps of:

transmitting data along the connection between the first routing element and the second routing element;

determining a value of length for the connection between the first routing element and the second routing element; and selecting one of a number of preprogrammed high-low watermark value pairs as a function of the length of the connection between the first routing element and the second routing element.

30. The method of claim 29, where said step of determining the length of the connection between the first routing element and the second routing element comprises the steps of:

transmitting a code word from the second routing element to the first routing element, and simultaneously, initiating a counter in the second routing element;

retransmitting the code word from the first routing element to the second routing element;

upon receiving the code word at the second routing element, stopping the counter; and determining an amount of time required for the code word to travel from the second routing element to the first routing element and from the first routing element to the second routing element based on the value of the counter, wherein the amount of time required for the code word to travel from the second routing element to the first routing element and then back to the second routing element is proportional to the length of the connection between the first routing element and the second routing element. —

* * * * *